(12) United States Patent
Ribeiro

(10) Patent No.: US 9,874,966 B2
(45) Date of Patent: Jan. 23, 2018

(54) ELECTROSTATIC DEVICE HAVING SPACED ELECTRODES

(71) Applicant: Microsoft Technology Licensing, LLC, Redmond, WA (US)

(72) Inventor: Flavio Protasio Ribeiro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 14/697,870

(22) Filed: Apr. 28, 2015

(65) Prior Publication Data
US 2016/0320895 A1  Nov. 3, 2016

(51) Int. Cl.
*G06F 3/041* (2006.01)
*G06F 3/044* (2006.01)
*G06F 3/0354* (2013.01)
*G06F 3/038* (2013.01)

(52) U.S. Cl.
CPC ............ *G06F 3/0416* (2013.01); *G06F 3/038* (2013.01); *G06F 3/03545* (2013.01); *G06F 3/044* (2013.01); *G06F 2203/04101* (2013.01); *G06F 2203/04103* (2013.01); *G06F 2203/04108* (2013.01)

(58) Field of Classification Search
CPC .............................. G06F 3/03545; G06F 3/044
USPC .......................................... 345/179, 173–174
See application file for complete search history.

(56) References Cited

U.S. PATENT DOCUMENTS

| | | |
|---|---|---|
| 6,005,200 A | 12/1999 | Stanchak et al. |
| 7,620,244 B1 | 11/2009 | Collier |
| 8,004,499 B2 | 8/2011 | Geaghan et al. |
| 8,059,103 B2 | 11/2011 | Geaghan |
| 8,338,724 B2 | 12/2012 | Reynolds |
| 8,624,609 B2 | 1/2014 | Philipp et al. |
| 8,638,320 B2 | 1/2014 | Harley et al. |
| 8,766,954 B2 | 7/2014 | Vuppu et al. |
| 8,878,823 B1 | 11/2014 | Kremin et al. |
| 2010/0252335 A1 | 10/2010 | Orsley |
| 2011/0291998 A1 | 12/2011 | Adams et al. |
| 2012/0068964 A1 | 3/2012 | Wright et al. |

(Continued)

FOREIGN PATENT DOCUMENTS

| | | |
|---|---|---|
| EP | 2339432 A2 | 6/2011 |
| WO | 2012177573 A2 | 12/2012 |
| WO | 2013122626 A1 | 8/2013 |

OTHER PUBLICATIONS

"International Preliminary Report on Patentability Issued in PCT Application No. PCT/US2016/026088", dated Jun. 8, 2017, 8 Pages.

(Continued)

*Primary Examiner* — Koosha Sharifi-Tafreshi
(74) *Attorney, Agent, or Firm* — Wade IP Law LLC

(57) ABSTRACT

Devices are described herein that include spaced electrodes. In one example, a spaced distance between the electrodes may cause a capacitance between the electrodes to exceed a capacitance threshold. In another example, an impedance component (e.g., a resistor or a capacitor) may be coupled between the electrodes. In accordance with this example, the impedance component may provide an impedance that is less than an impedance threshold while causing an absolute difference between voltages that are induced by the respective electrodes to exceed a voltage threshold.

20 Claims, 16 Drawing Sheets

(56) References Cited

U.S. PATENT DOCUMENTS

| | | | |
|---|---|---|---|
| 2012/0327042 A1* | 12/2012 | Harley | G06F 3/044 345/179 |
| 2013/0002606 A1 | 1/2013 | Mann | |
| 2013/0106717 A1 | 5/2013 | Sundara-Rajan et al. | |
| 2013/0113762 A1 | 5/2013 | Geaghan | |
| 2013/0278550 A1 | 10/2013 | Westhues | |
| 2014/0002422 A1* | 1/2014 | Stern | G06F 3/03545 345/179 |
| 2014/0028635 A1 | 1/2014 | Krah | |
| 2015/0070315 A1* | 3/2015 | Oda | G06F 3/046 345/174 |

OTHER PUBLICATIONS

Vanga, et al., "Multi Stage Based Time Series Analysis of User Activity on Touch Sensitive Surfaces in Highly Noise Susceptible Environments", In International Journal of Computer Applications, vol. 105, No. 16, Nov. 2014, pp. 23-31.

Dietz, et al., "DiamondTouch: A MultiUser Touch Technology ", In Proceedings of the 14th Annual ACM Symposium on User Interface Software and Technology, Nov. 11, 2001, 8 pages.

Haran, On, "Technologies and Requirements for Digital Pens", Published on: Jul. 2014, 8 pages, Available at: http://informationdisplay.org/IDArchive/2014/JulyAugust/FrontlineTechnologyDigitalPens.aspx.

Wang, et al., "Detecting and Leveraging Finger Orientation for Interaction With Direct-Touch Surfaces", In Proceedings of the 22nd Annual ACM Symposium on User Interface Software and Technology, Oct. 4, 2009, pp. 23-32.

Maravilla, et al., "Dual Touch and Gesture Recognition in 4-Wire Resistive Touchscreens", In Proceedings of IEEE Sensors, Nov. 2, 2014, 4 pages.

"International Search Report & Written Opinion Issued in PCT Application No. PCT/US2016/026088", dated Jun. 29, 2016, 11 Pages.

"Second Written Opinion Issued in PCT Application No. PCT/US2016/026088", dated Mar. 7, 2017, 7 Pages.

* cited by examiner

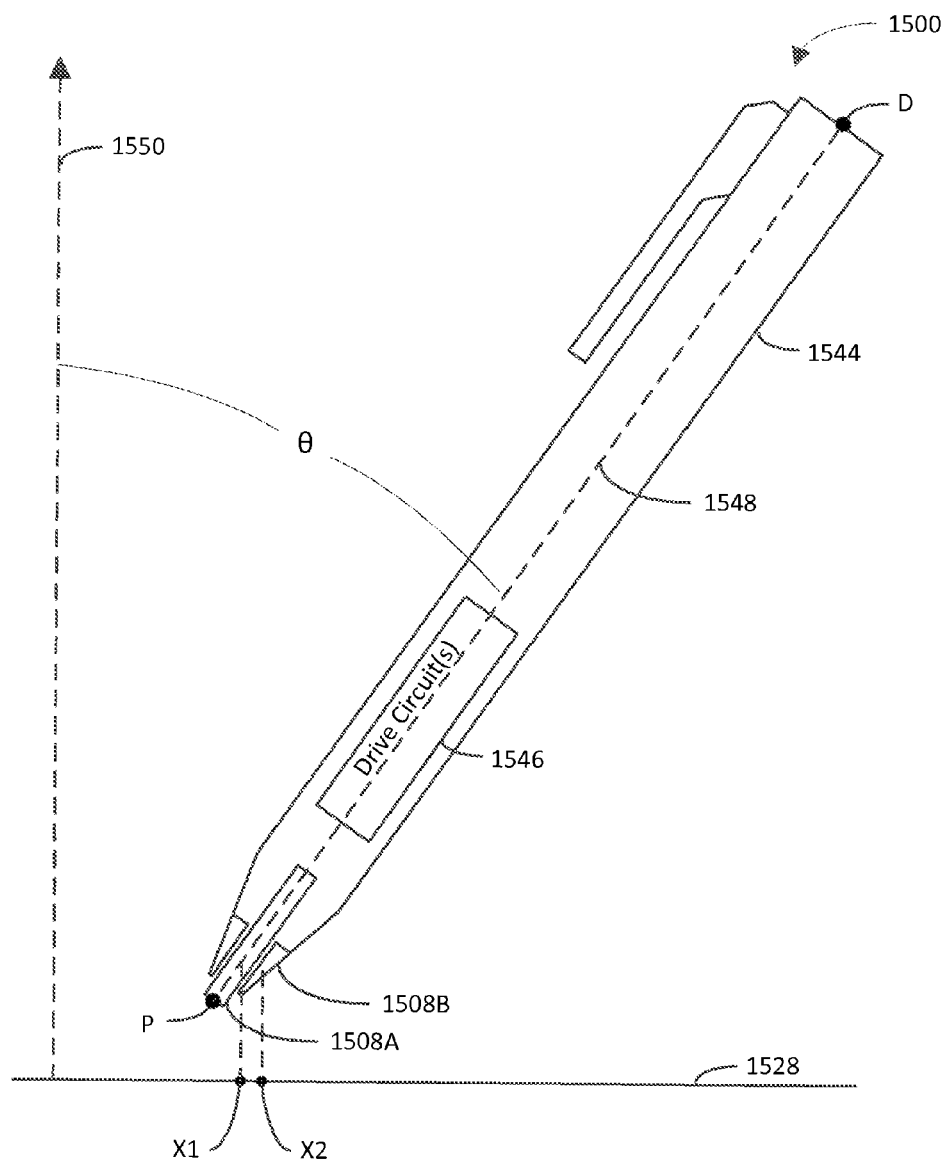
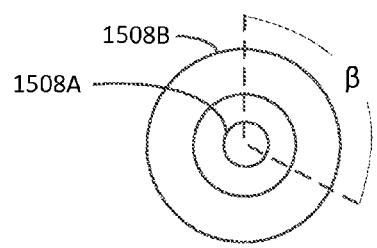
FIG. 15A
FIG. 15B

ELECTROSTATIC DEVICE HAVING SPACED ELECTRODES

BACKGROUND

Computing devices (e.g., tablet computers, personal digital assistants) often include touch screens that enable the computing devices to detect touch commands and/or hover commands. For instance, a touch screen may include any of a variety of elements that are responsive to resistance, capacitance, and/or light for enabling detection of such commands. A touch screen usually includes a sensor matrix, which includes an array of row sensors and an array of column sensors. Each of the sensors in the arrays is typically configured to detect an object when the object is placed within a certain proximity to the sensor. For instance, an amount of resistance, capacitance, and/or light detected by the sensor may indicate whether the object is proximate the sensor. A location of the object with respect to the touch screen may be determined based on the amount(s) of resistance, capacitance, and/or light that are detected by one or more of the sensors.

A stylus is an object that is commonly used to provide input to a touch screen. For instance, the stylus may be used to write a message on the touch screen and/or to select icons that are displayed on the touch screen. It is desirable for a detected location of the stylus to be as close as possible to the physical location at which the stylus is touching the touch screen or being used to point at the touch screen. However, in practice, the detected location differs from the physical location, and the difference (referred to as the position error) typically increases as the stylus is tilted away from an orientation that is normal (i.e., perpendicular) to the touch screen.

An electrostatic stylus is a stylus that generates an active signal (e.g., broadcast signal) for detection by a capacitive sensor matrix. An active electrostatic stylus often is detectable at greater distances from a sensor matrix than a passive stylus. However, the configuration of a conventional active electrostatic stylus typically does not facilitate estimation of the tilt of the electrostatic stylus. For instance, the active signal induced by a conventional electrostatic stylus onto sensor matrix electrodes may be too localized in space (or equivalently, too weak at matrix electrodes which are not immediate neighbors of the contact point) to enable tilt angle estimation. Accordingly, electrostatic styluses traditionally are quite susceptible to position error.

SUMMARY

Various devices are described herein that include spaced electrodes. For instance, the spaced electrodes may serve to, among other things, increase signal strength, facilitate tilt estimation, and/or facilitate correction of tilt-dependent position error. In one example, a spaced distance between the electrodes may cause a capacitance between the electrodes to exceed a capacitance threshold. In another example, an impedance component (e.g., a resistor or a capacitor) may be coupled between the electrodes. In accordance with this example, the impedance component may provide an impedance that is less than an impedance threshold. This impedance may be further designed to cause an absolute difference between voltages induced by the respective electrodes onto the sensor matrix to exceed a voltage threshold.

A first example device includes a member, a first electrode, a drive circuit, and a second electrode. The member has a proximal end and a distal end at opposing ends of an axis. The first electrode is positioned at the proximal end of the member. The first electrode is configured to electrostatically couple a principal signal to a sensor matrix of a computing device, such that an intensity of the principal signal that is sensed by the sensor matrix increases as the first electrode approaches the sensor matrix. The drive circuit is configured to generate the principal signal. The principal signal is an active signal. The second electrode is positioned a spaced distance from the first electrode. The spaced distance is configured to cause a designated capacitance between the first electrode and the second electrode to exceed a capacitance threshold and to cause the second electrode to electrostatically couple a secondary signal, which is based on the principal signal, to the sensor matrix as the first electrode is placed proximate the sensor matrix.

A second example device includes a member, a first electrode, a drive circuit, a second electrode, and an impedance component. The member has a proximal end and a distal end at opposing ends of an axis. The first electrode is positioned at the proximal end of the member. The first electrode is configured to electrostatically couple a principal signal to a sensor matrix of a computing device, such that an intensity of the principal signal that is sensed by the sensor matrix increases as the first electrode approaches the sensor matrix. The principal signal induces a first voltage that is measurable at the sensor matrix. The drive circuit is configured to generate the principal signal. The principal signal is an active signal. The second electrode is positioned a spaced distance from the first electrode. The second electrode is configured to electrostatically couple a secondary signal, which is based on the principal signal, to the sensor matrix as the first electrode is placed proximate the sensor matrix. The secondary signal induces a second voltage that is measurable at the sensor matrix. The impedance component is electrically connected between the first electrode and the second electrode. The impedance component is configured to provide a designated impedance that is less than an impedance threshold while causing an absolute difference between the first voltage and the second voltage to exceed a voltage threshold.

A third example device includes a member, a first electrode, a drive circuit, and multiple second electrodes. The member has a proximal end and a distal end at opposing ends of an axis. The first electrode is positioned at the proximal end of the member. The first electrode is configured to electrostatically couple a principal signal to a sensor matrix of a computing device, such that an intensity of the principal signal that is sensed by the sensor matrix increases as the first electrode approaches the sensor matrix. The drive circuit is configured to generate the principal signal. The principal signal is an active signal. The second electrodes are configured to electrostatically couple respective secondary signals, which are based on the principal signal, to the sensor matrix as the first electrode is placed proximate the sensor matrix. Each second electrode is positioned a respective spaced distance from the first electrode. Each spaced distance is configured to cause a respective designated capacitance between the first electrode and the respective second electrode to exceed a capacitance threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 16A:
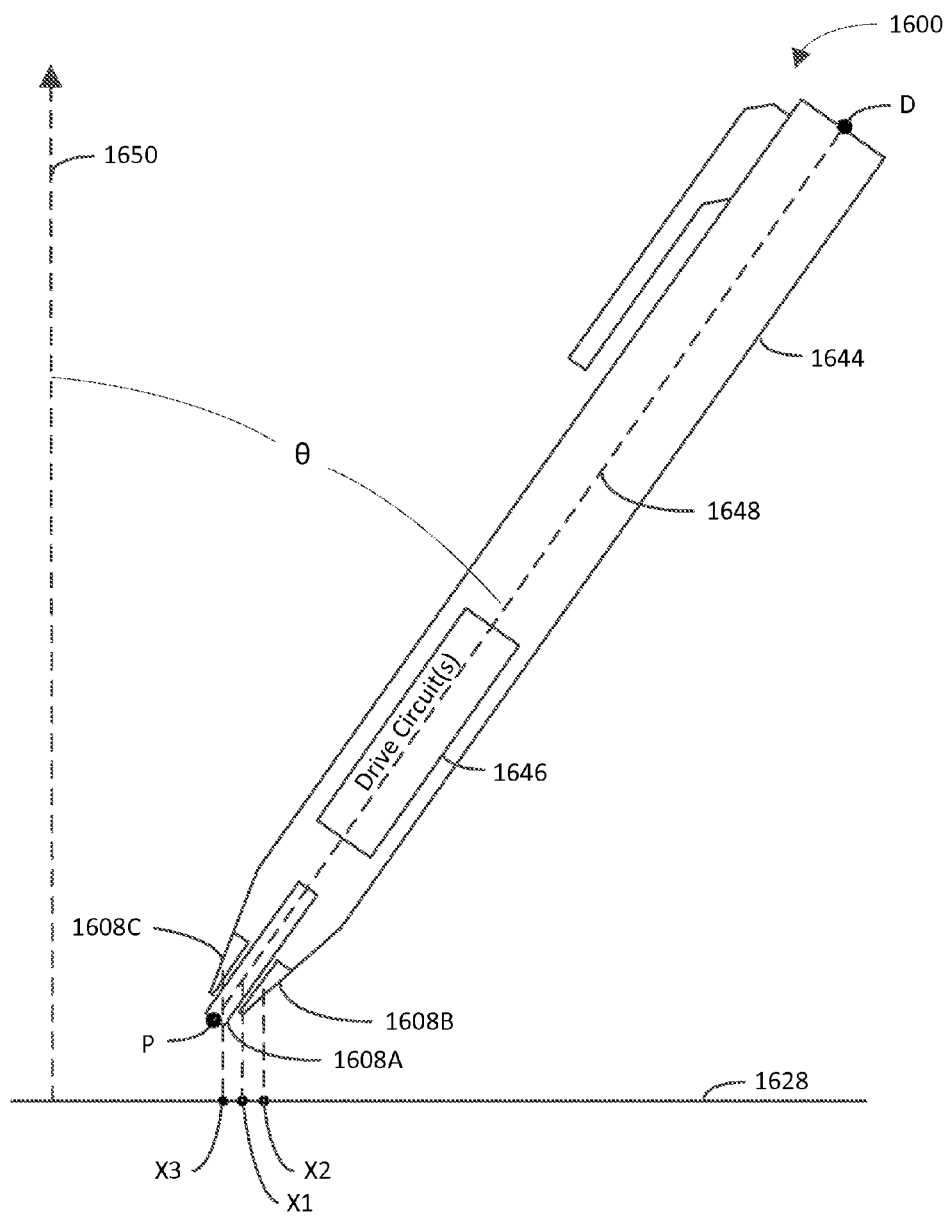
Figure 17:
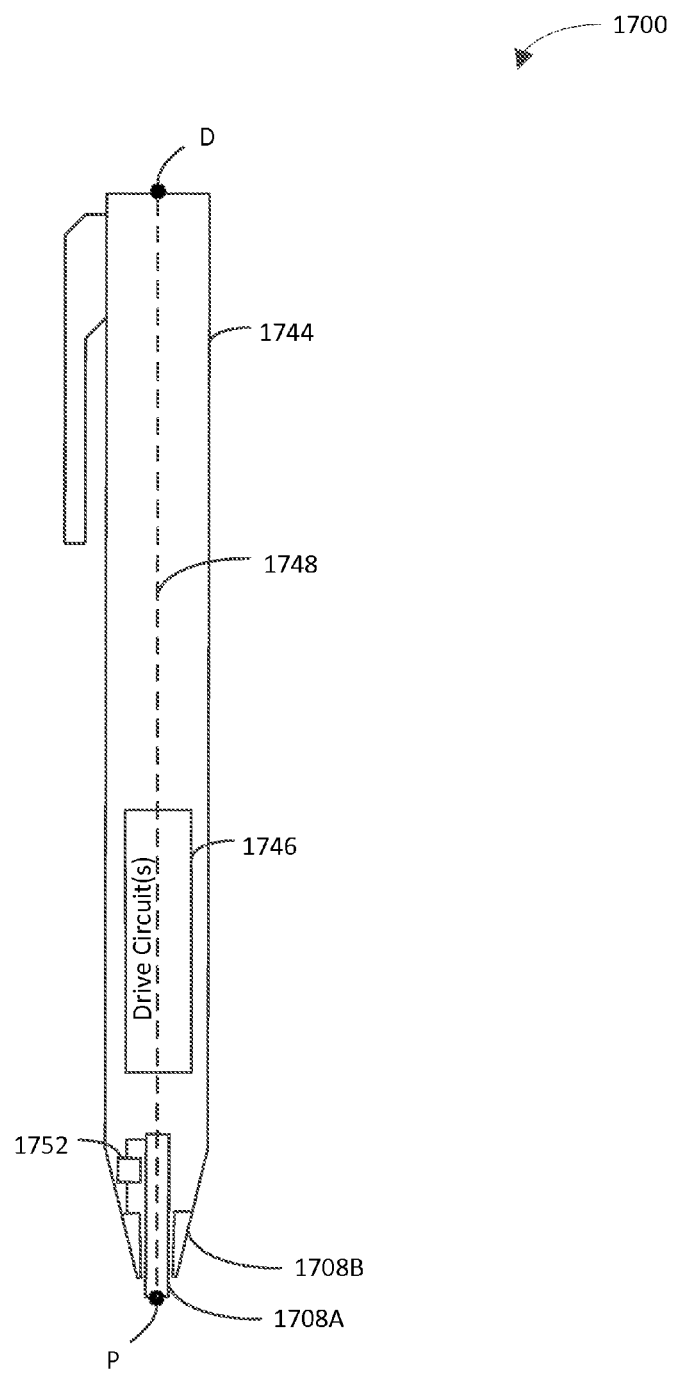

FIGS. 15A, 16A, and 17 are cross-sectional views of example electrostatic devices having spaced electrodes in accordance with embodiments.

Figure 16B:
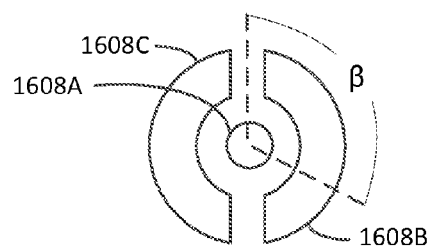

FIGS. 15B and 16B are end views of the electrostatic devices shown in FIGS. 15A and 16A, respectively, in accordance with embodiments.

FIGS. 18-21 are illustrations showing generation of capacitance maps in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example devices described herein include spaced electrodes. In one example, a spaced distance between the electrodes may cause a capacitance between the electrodes to exceed a capacitance threshold. In another example, an impedance component (e.g., a resistor or a capacitor) may be coupled between the electrodes. In accordance with this example, the impedance component may provide an impedance that is less than an impedance threshold. This impedance may be further designed to cause an absolute difference between voltages induced by the respective electrodes to exceed a voltage threshold.

Example devices described herein have a variety of benefits as compared to conventional devices for providing input to a computing device. For instance, an example device may be capable of increasing the accuracy with which a computing device is capable of determining a physical location of the device or a portion thereof (e.g., a point on the device or the portion thereof that is closest to a sensor matrix). The increased accuracy may reduce a difference between the physical location and a detected location of the device that is calculated by the computing device.

Rather than treating cross-coupling between electrodes as parasitic and undesirable, the example devices described herein may be configured to use such cross-coupling for a beneficial purpose, including but not limited to increasing an effective area of an electrode of the device, amplifying a signal that is coupled to a touch screen of a computing device, and increasing tilt and/or twist estimation accuracy. For instance, such beneficial purposes may be achieved by controlling the cross-coupling between the electrodes by configuring the spacing between the electrodes of the device accordingly. Associated circuits in the device and algorithms for determining locations of the electrodes therein, for determining tilt of the device with respect to the touch screen, and/or for determining twist of the device about a longitudinal axis of the device may be configured to take into consideration the configured spacing between the electrodes.

For example, having spaced electrodes as described herein may serve to increase signal strength of signals generated by the device and/or to spatially widen the response of the device. In accordance with this example, a signal that is provided to a first electrode of the device may be capacitively coupled to second electrode(s) of the device to increase the signal strength of the device and/or to spatially widen the response of the device. For instance, the second electrode(s) may electrostatically couple respective signal(s) to a touch screen of a computing device (e.g., at prescribed level(s)) based on the signal that is provided to the first electrode as a result of the first electrode being capacitively coupled to the second electrode(s). A device having spaced electrodes as described herein may have a greater signal strength, as compared to conventional devices, for the same drive voltage. This additional signal strength may provide additional noise immunity (e.g., a higher signal-to-noise ratio) for the device and/or enable detection of the device at a greater hover height with respect to a touch screen of a computing device.

In another example, having the spaced electrodes may facilitate tilt estimation and/or tilt-dependent error correction. In accordance with this example, the device may include separate drive circuits for generating respective active signals to be electrostatically coupled to a touch screen of a computing device. Electrostatically coupling the active signals to the touch screen may facilitate a determination of a tilt and/or a twist of the device. Tilt indicates an angle of the device with respect to an axis that is normal (i.e., perpendicular) to a touch screen. Twist indicates an amount of rotation of the device about an axis (e.g., a longitudinal axis), which is along a length of the device, with reference to a point in a plane that is perpendicular to the axis. Knowledge of the tilt and/or the twist of a device may enable inking features associated with the device to be utilized. Examples of an inking feature include but are not limited to changing a line thickness that is produced by the device, changing an extent to which writing of the device blends with a background on which the writing is overlaid, opacity of the writing, and taper of the writing. For instance, such inking features may be more pronounced in scenarios in which an electrode of a device is used to represent a tip that is non-symmetrical (e.g., wedge-shaped), such as the tip of a calligraphy pen, a marker, or a paint brush.

Figure 1:
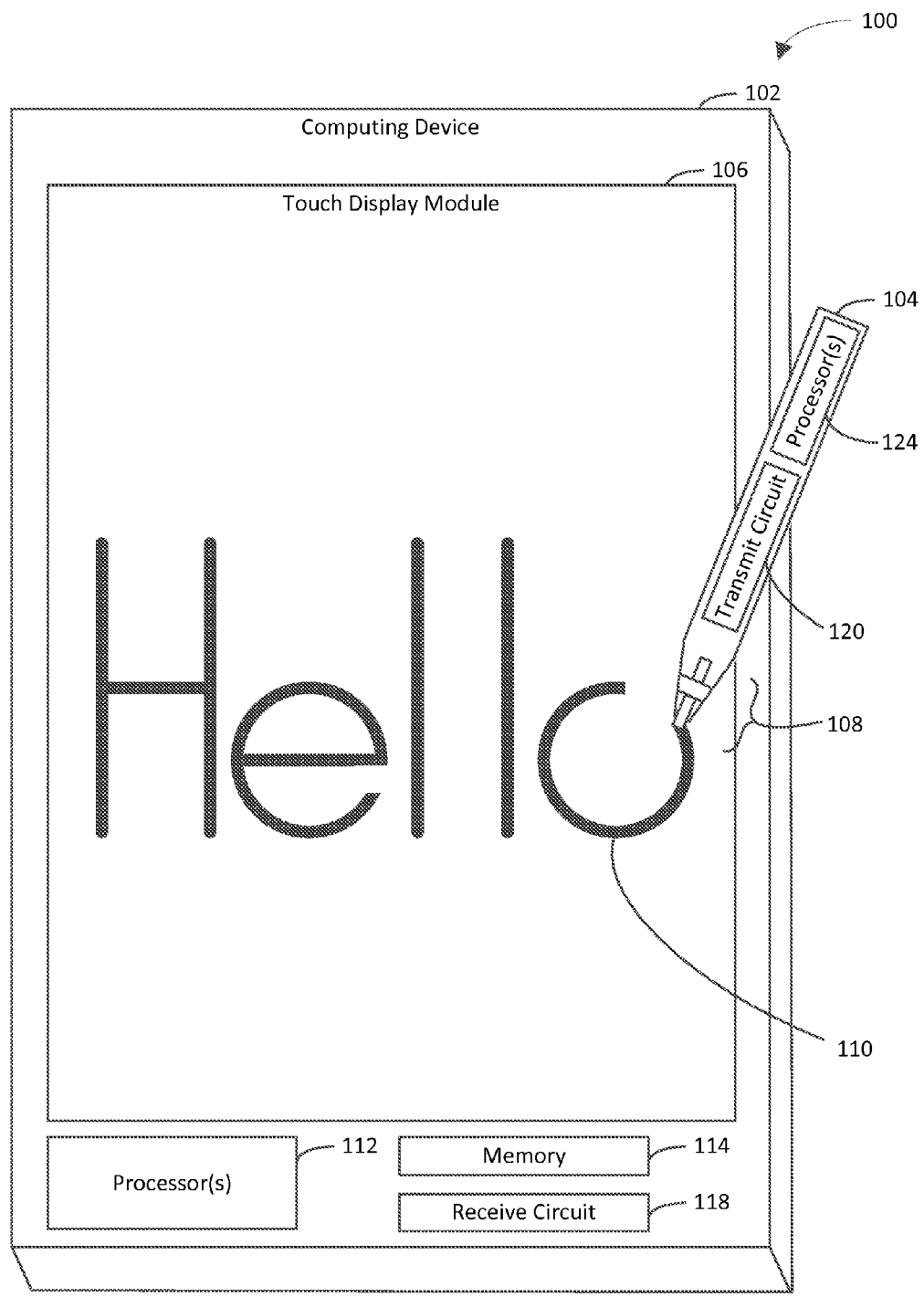
FIG. 1 is a perspective view of an example system that includes a computing device and an input device including spaced electrodes in accordance with an embodiment.

FIG. 1 is a perspective view of an example system 100 in accordance with an embodiment. The system 100 includes a computing device 102 and an input device 104. The computing device 102 is a processing system that is capable of receiving input from the input device 104. An example of a processing system is a system that includes at least one processor that is capable of manipulating data in accordance with a set of instructions. For instance, a processing system may be a computer (e.g., a tablet computer, a laptop computer, or a desktop computer) or a personal digital assistant.

The computing device 102 includes a touch display module 106, processor(s) 112, a memory 114, and a receive circuit 118. The touch display module 106 may include any of a variety of components, including but not limited to a touch/stylus sensor, touch/stylus electronics, a backlight, display electronics, cover glass, circuit boards, flexible printed circuits, and adhesive layers. For instance, the touch display module 106 is configured to include a touch screen. Touch and/or hover functionality of the touch display module 106 is enabled by the receive circuit 118, which is capable of sensing objects that are placed proximate the touch display module 106. For example, the receive circuit 118 may sense a location at which an object physically touches the touch display module 106. In accordance with this example, no space is between the object and the cover glass of the touch display module 106. In another example, the receive circuit 118 may sense a location at which an object hovers over the touch display module 106. In accordance with this example, the object and the touch display module 106 are spaced apart and do not touch. The receive circuit 118 receives input from such objects via active or passive signals at locations on the touch display module 106 that correspond to locations of the objects. The touch display module 106 includes pixels having characteristics that are capable of being modified in response to receipt of such input at the locations on the touch display module 106 that correspond to the pixels.

The processor(s) 112 are capable of performing operations based on instructions that are stored in the memory 114 (e.g., in response to receipt of input from the input device 104). For instance, the processor(s) 112 are configured to determine locations of spaced electrodes 108, which are included in the input device 104, based on input that is received by the receive circuit 118 from the input device 104. The processor(s) 112 are capable of modifying one or more characteristics of the pixels in the touch display module 106 in response to such input. As shown in FIG. 1, the processor(s) 112 have caused writing 110 to be displayed on the touch display module 106 by changing characteristic(s) of the corresponding pixels in the touch display module 106. More particularly, the processor(s) 112 have caused the word "Hello" to be displayed on the touch display module 106 in response to at least one of the spaced electrodes 108 of the input device 104 tracing the word "Hello" along a path that is proximate the touch display module 106.

The memory 114 stores computer-readable instructions that are executable by the processor(s) 112 to perform operations. The memory 114 may include any suitable type of memory, including but not limited to read only memory (ROM), random access memory (RAM), or flash memory.

The input device 104 includes the aforementioned spaced electrodes 108, a transmit circuit 120, and processor(s) 124. The spaced electrodes 108 may be configured to enable the computing device 102 to more accurately track one or more of the electrodes 108 or a portion thereof (e.g., an edge of an electrode that is closest to the touch display module 106) when the input device 104 is tilted from a position that is normal to the touch display module 106. Accordingly, the spaced electrodes 108 may be configured to cause the location where writing is displayed on the touch display module 106 to more closely match the intended location of a user of the input device 104 (e.g., when the input device 104 is placed in a traditional writing position). For instance, the electrodes 108 may be configured to cause the estimated location of an electrode as determined by the processor(s) 112 (i.e., the detected location of the electrode) to track a point on the electrode that is closest to the touch display module 106.

The electrodes 108 may be configured to enable the computing device 102 to more accurately determine a tilt of the input device 104 with respect to the touch display module 106 and/or a twist of the input device 104 about an axis that extends along the length of the input device 104. The tilt and/or the twist of the input device 104 may be used by processor(s) 112 of the computing device 102 to determine tilt-dependent and/or twist-dependent attribute(s) (e.g., line thickness, blending, opacity, or taper) to be applied to the writing 110. Further details regarding some embodiments in which a device has spaced electrodes are provided below with reference to FIGS. 2-17.

The transmit circuit 120 is configured to transmit an input to the computing device 102 to cause the processor(s) 112 to determine a location of the writing electrode 108.

The processor(s) 124 are configured to generate the input that is transmitted to the computing device 102 via the transmit circuit 120.

Each of the computing device 102 and the input device 104 may be electrically connected to a common DC ground, though the scope of the example embodiments is not limited in this respect. For instance, the computing device 102 and the input device 104 may have capacitively coupled grounds, which may be achieved by a user grasping the computing device 102 and the input device 104.

Figure 2:
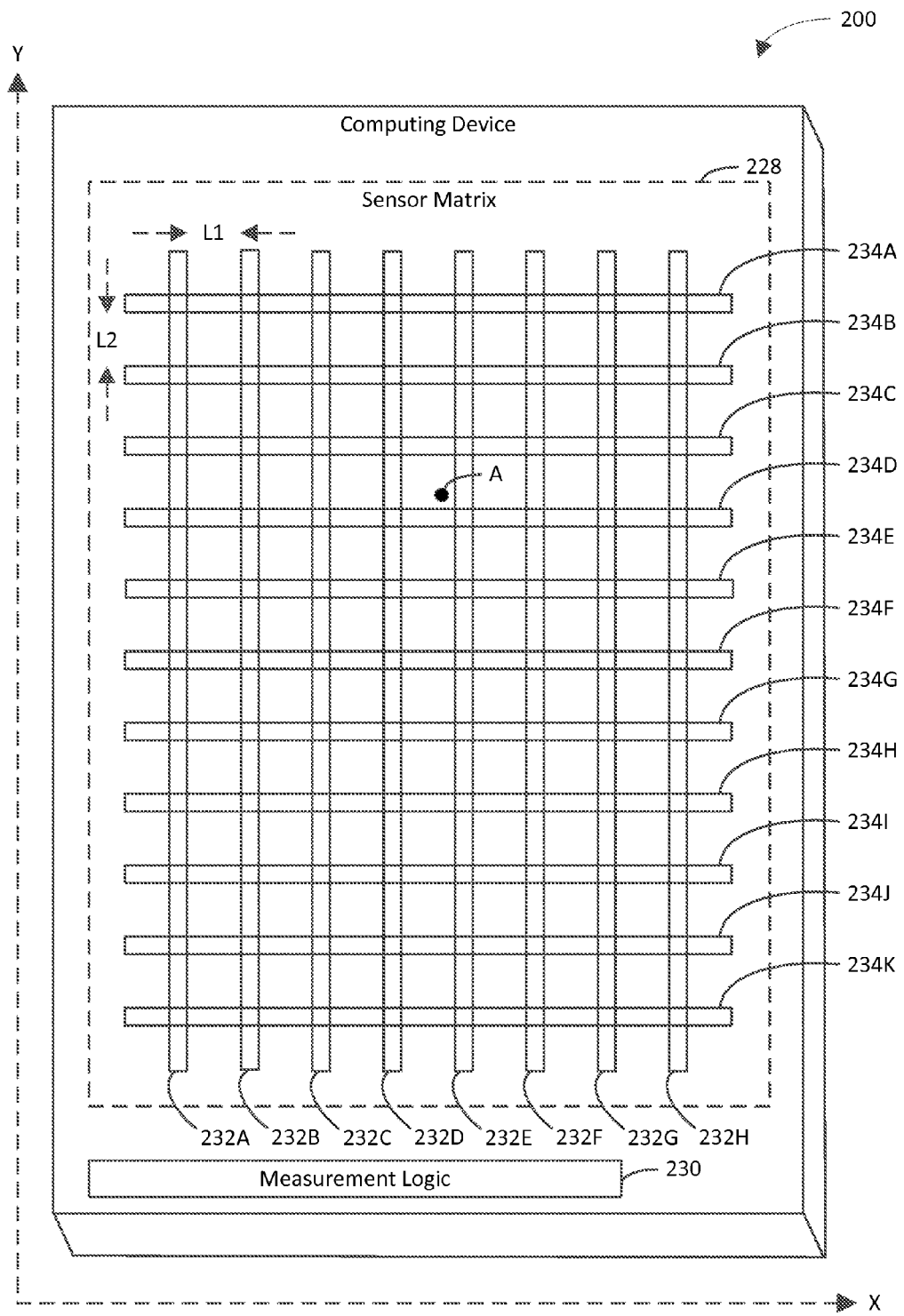
FIG. 2 is a block diagram of an example computing device that includes a sensor matrix in accordance with an embodiment.

FIG. 2 is a block diagram of an example computing device 200 in accordance with an embodiment. The computing device 200 includes a sensor matrix 228 and measurement logic 230. The sensor matrix 228 includes a plurality of column electrodes 232A-232H and a plurality of row electrodes 234A-234K. The plurality of column electrodes 232A-232H are arranged to be substantially parallel with a Y-axis, as shown in FIG. 2. The plurality of row electrodes 234A-234K are arranged to be substantially parallel with an X-axis. The plurality of column electrodes 232A-232H are arranged to be substantially perpendicular to the plurality of row electrodes 234A-234K. A first pitch, L1, between adjacent column electrodes 232A-232H indicates a distance between the midpoints of the adjacent column electrodes 232A-232H. A second pitch, L2, between adjacent row electrodes 234A-234K indicates a distance between the midpoints of the adjacent row electrodes 234A-234K. The first pitch, L1, and the second pitch, L2, may be any suitable values. The first pitch, L1, and the second pitch, L2, may be the same or have different values. For instance, the first pitch, L1, and/or the second pitch, L2, may be approximately 2 mm, 3 mm, 4 mm, or 5 mm.

Placement of an object (e.g., one or more of the electrodes 108) proximate a subset (e.g., one or more) of the column electrodes 232A-232H and a subset (e.g., one or more) of the row electrodes 234A-234K causes a change of capacitance to occur between the object and the electrodes in those subsets. For instance, such placement of the object may cause the capacitance to increase from a non-measurable quantity to a measurable quantity. The change of capacitance between the object and each electrode in the subsets may be used to generate a "capacitance map," which may correlate to a shape of the object. For instance, a relatively greater capacitance change may indicate that a distance between the object and the corresponding electrode is relatively small. A relatively lesser capacitance change may indicate that a distance between the object and the corresponding electrode is relatively large. Accordingly, a capacitance map, which indicates capacitance changes associated with respective electrodes in the subsets, may indicate the shape of the object.

In an example embodiment, placement of an object proximate the sensor matrix 228 at point A causes a first capacitance between the object and the row electrode 234C to change, a second capacitance between the object and the row electrode 234D to change, a third capacitance between the object and the column electrode 232D to change, and a fourth capacitance between the object and the column electrode 232E to change. It will be recognized that capacitances between the object and other respective electrodes may change, as well. For instance, the capacitances between the object and those other respective electrodes may change so long as the object is within a designated proximity (3 mm, 5 mm, 7 mm, 10 mm, etc.) to those other electrodes. However, such changes would be less than the changes to the first, second, third, and fourth capacitances mentioned above due to the greater proximity of the object to those other electrodes. Accordingly, the discussion will focus on the first, second, third, and fourth capacitances mentioned above for ease of understanding, though it will be recognized that capacitances between the object and the other respective electrodes may be taken into consideration in practice.

The measurement logic 230 is configured to determine a location of an object that is placed proximate the sensor matrix 228 based on capacitance changes that are sensed by the plurality of column electrodes 232A-232H and the plurality of row electrodes 234A-234K or respective subsets thereof. Accordingly, in the example embodiment mentioned above, the measurement logic 230 determines (e.g., estimates) the location, A, of the object based on the changes to the first, second, third, and fourth capacitances sensed at respective electrodes 234C, 234D, 232D, and 232E. For instance, the measurement logic 230 may estimate (X,Y) coordinates of the location, A. It will be recognized that the estimated coordinates of the location, A, may correspond to a centroid or a center of mass of the object.

Determining the location, A, of the object with an accuracy on the order of the first pitch, L1, and/or the second pitch, L2, is relatively straightforward. For instance, a location of a column electrode at which a greatest capacitance change is sensed with respect to the object may indicate (e.g., provide an estimate of) an X coordinate of the location, A. A location of a row electrode at which a greatest capacitance change is sensed with respect to the object may indicate (e.g., provide an estimate of) a Y coordinate of the location, A.

One way to increase the accuracy of the estimate that is determined by the measurement logic 230 is to decrease the first pitch, L1, between adjacent column electrodes 232A-232H and/or the second pitch, L2, between adjacent row electrodes 234A-234K. Another way to increase the accuracy is to interpolate (e.g., as a continuous function) the capacitance changes that are sensed by the plurality of column electrodes 232A-232H and the plurality of row electrodes 234A-234K or respective subsets thereof. For instance, in accordance with the example embodiment mentioned above, the measurement logic 230 interpolates the changes to the first, second, third, and fourth capacitances to determine the location, A.

Figure 3:
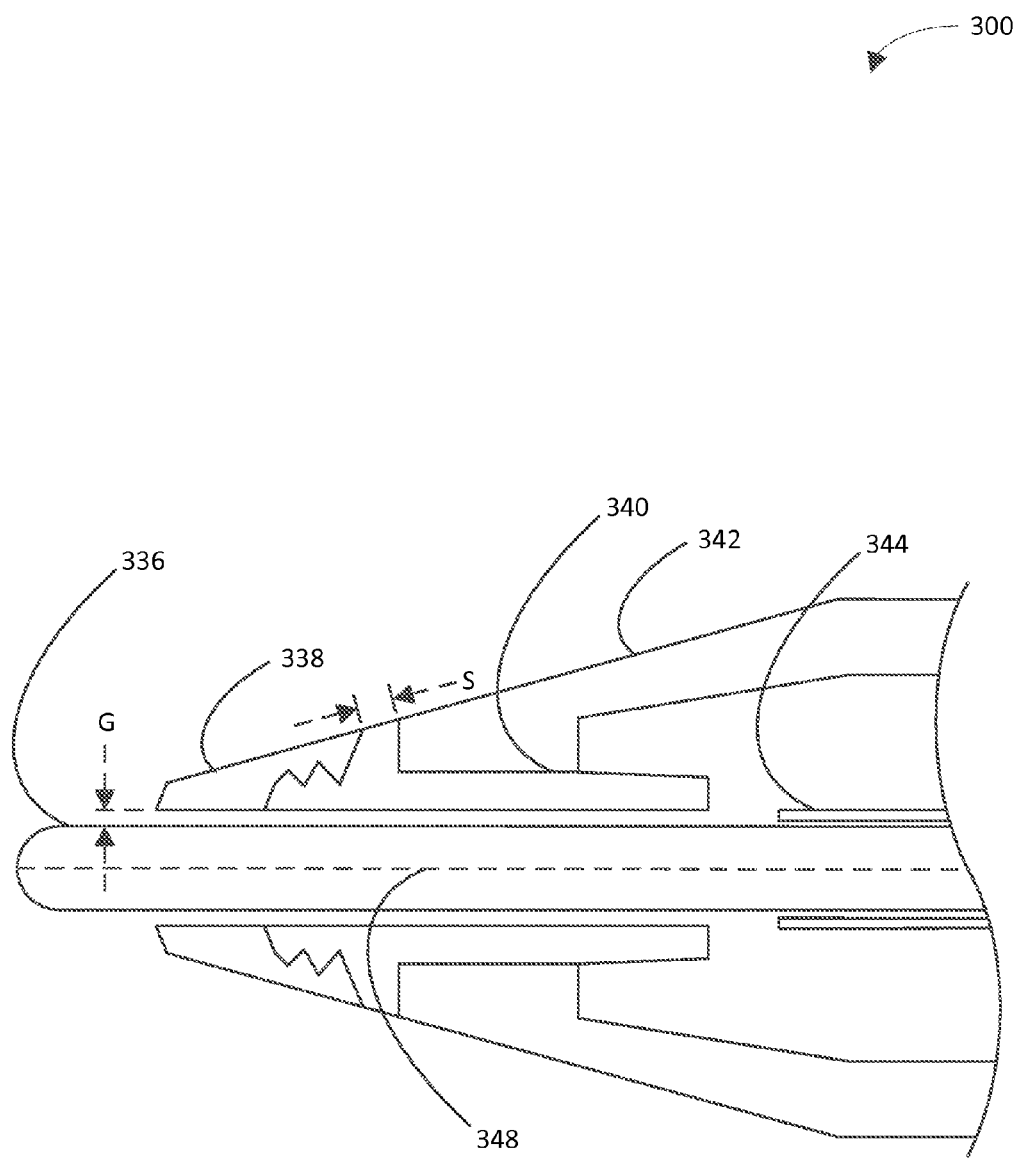
FIG. 3 is a cross-sectional view of a portion of an example electrostatic device having spaced electrodes in accordance with an embodiment.

FIG. 3 is a cross-sectional view of a portion 300 of an example electrostatic device (e.g., input device 104) in accordance with an embodiment. The portion 300 includes a first electrode 336, a second electrode 338, electrically insulating material (hereinafter "insulator") 340, a member 342, and a guide shaft 344. Each of the first electrode 336 and the second electrode 338 may be fabricated from any suitable electrically conductive material, such as aluminum. The first electrode 336 and the second electrode 338 are separated by a spaced distance, G. The spaced distance, G, may be configured to be within any suitable range of distances. For instance, the spaced distance, G, may be configured to be in a range of 25-50 micrometers (µm), 50-100 µm, or 100-150 µm. The first electrode 336 has a width in a plane that is perpendicular to an axis 348, which extends along the length of the first electrode 336. The width may be configured to be within any suitable range of widths, including but not limited to 0.7-0.9 millimeters (mm), 0.9-1.1 mm, and 1.1-1.3 mm.

The insulator 340 electrically insulates the first electrode 336 and the second electrode 338 from the member 342. The insulator 340 may be fabricated from any suitable insulating material, such as non-conductive plastic. The insulator 340 is configured to separate the second electrode 338 from the member 342 by at least an insulation distance, S. The insulation distance, S, may be configured to be within any suitable range of distances. For instance, the insulation distance, S, may be configured to be in a range of 0.3-0.5 millimeters (mm), 0.5-0.7 mm, or 0.7-0.9 mm.

The member 342 provides structural support for the electrostatic device. The member 342 may be electrically conductive. The member 342 may be electrically grounded during operation, for example, by a user grasping the member 342.

The guide shaft 344 guides the first electrode 336 along the axis 348. For instance, the guide shaft 344 may allow the first electrode 336 to move along the axis 348 while limiting movement of the first electrode 336 in a radial direction that is perpendicular to the axis 348. The guide shaft 344 may be fabricated from any suitable electrically conductive material, such as steel or aluminum.

The example ranges for width of the first electrode 336, the spaced distance, G, and the insulation distance, S, mentioned above are provided for illustrative purposes and are not intended to be limiting. It will be recognized that the width of the first electrode 336, the spaced distance, G, and the insulation distance, S, may be any suitable values.

Figure 4:
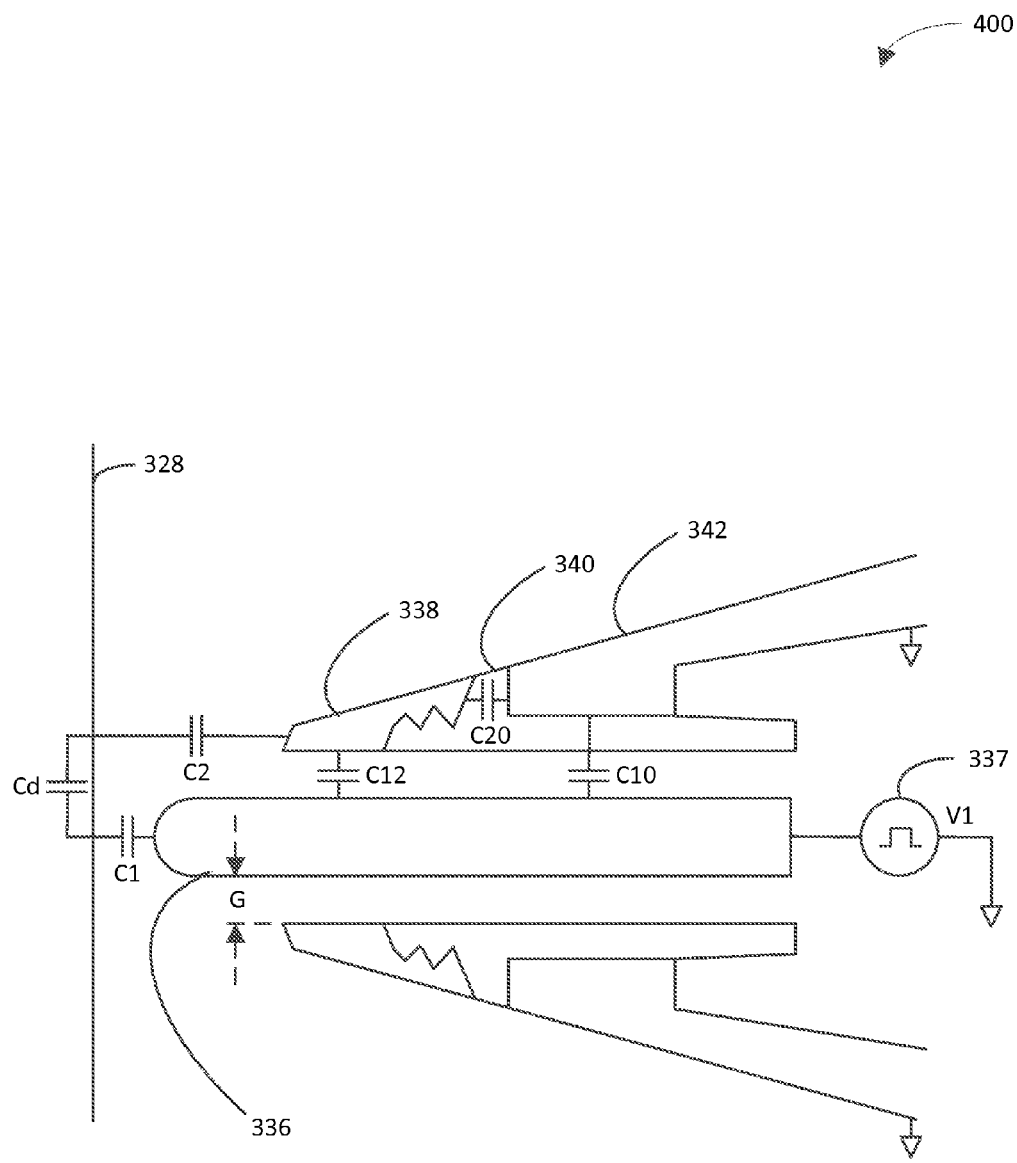
FIG. 4 is an example equivalent model of the portion of the electrostatic device shown in FIG. 3 utilizing a single drive circuit in accordance with an embodiment.
Figure 5:
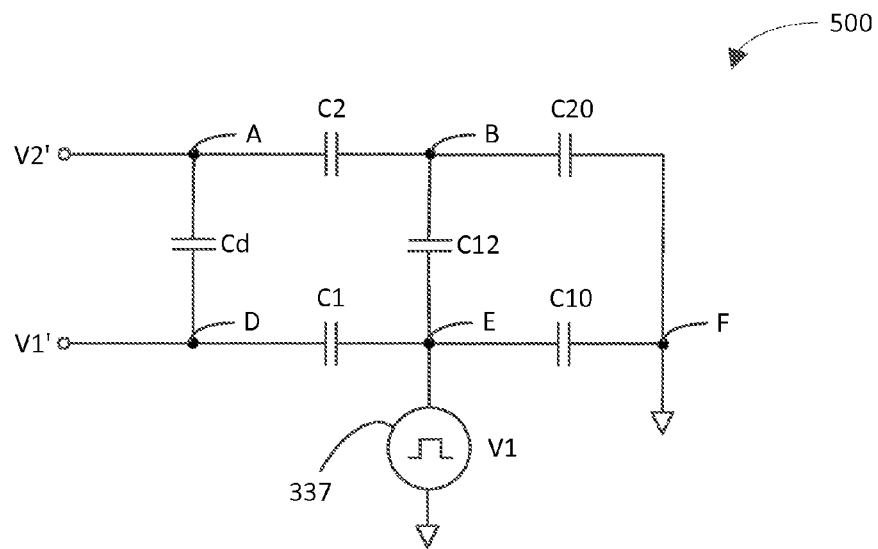
FIG. 5 is an example circuit diagram based on the equivalent model shown in FIG. 4 in accordance with an embodiment.

The portion 300 of the electrostatic device in FIG. 3 is shown to include two electrodes 336 and 338 for illustrative purposes and is not intended to be limiting. It will be recognized that the portion 300 of the electrostatic device shown in FIG. 3 may include any suitable number of electrodes (e.g., 3, 4, or 5 electrodes). For example, the first electrode 336 may be segmented into multiple first electrodes. In another example, the second electrode 336 may be segmented into multiple second electrodes. As will be discussed in further detail below with reference to FIG. 17, an impedance component (e.g., a resistor and/or a capacitor) may be electrically connected between the first electrode 336 (or a segment thereof) and the second electrode 338 (or a segment thereof). In an embodiment, the guide shaft 344 is electrically coupled to the first electrode 336. For instance, the first electrode 366 may come into contact with the guide shaft 344 as the first electrode 336 moves along the axis 348. In accordance with this embodiment, an impedance component may be electrically connected between the guide shaft 344 and the second electrode (or a segment thereof) in order to form an electrical connection between the first electrode 336 (or the segment thereof) and the second electrode (or a segment thereof). It will be further recognized that the electrostatic device may include any suitable number of drive circuits to drive the various electrodes in the electrostatic device. For instance, FIGS. 4-5 are described below with reference to an electrostatic device that includes two electrodes and a single drive circuit for non-limiting illustrative purposes. FIGS. 6-10 are described below with reference to an electrostatic device that includes two electrodes and two drive circuits for non-limiting illustrative purposes.

FIG. 4 is an example equivalent model 400 of the portion 300 of the electrostatic device shown in FIG. 3 utilizing a single drive circuit 337 in accordance with an embodiment. The equivalent model 400 is shown to include the first electrode 336, the second electrode 338, the insulator 340, and the member 342, all of which are depicted in FIG. 3. A sensor matrix is represented by a line 328 for illustrative purposes. The equivalent model 400 further includes a first capacitance, C1, between the first electrode 336 and the sensor matrix 328; a second capacitance, C2, between the second electrode 338 and the sensor matrix 328; a third capacitance, C10, between the first electrode 336 and the member 342; a fourth capacitance, C20, between the second electrode 338 and the member 342; a designated capacitance, C12, between the first electrode 336 and the second electrode 338; and a sensor capacitance, Cd, between sensor(s) of the sensor matrix 328 that measure respective voltages that are received from the electrostatic device as a result of the drive circuit 337 generating an active signal (e.g., a voltage signal), V1. For instance, the voltages may include a first voltage associated with the first electrode 336 and a second voltage associated with the second electrode 338. The equivalent model 400 ignores resistances for purposes of illustration and is not intended to be limiting. It will be recognized that the sensor capacitance, Cd, may be replaced by a wire if the voltages are measured by a single sensor of the sensor matrix 328.

The designated capacitance, C12, may be substantially greater than the other capacitances, C1, C2, C10, C20, and Cd shown in FIG. 4. For instance, the designated capacitance, C12, may be greater than or equal to five times each of the other capacitances, greater than or equal to ten times each of the other capacitances, or greater than or equal to twenty times each of the other capacitances. The designated capacitance, C12, may be substantially increased with respect to the other capacitances by configuring the spaced distance, G, between the first electrode 336 and the second electrode 338 to be less than a suitable distance threshold and/or by physically connecting a capacitor having a capacitance that exceeds a suitable capacitance threshold between the first electrode 336 and the second electrode 338. For instance, increasing the designated capacitance, C12, as described herein may cause the first electrode 336 and the second electrode 338 to behave as though the first electrode 336 and the second electrode 338 are a common, single electrode, though the first electrode 336 and the second electrode 338 remain separated by the spaced distance, D.

The second capacitance, C2, may be greater than the first capacitance, C1, though the scope of the example embodiments is not limited in this respect. For instance, configuring the first and second electrodes 336 and 338 such that the second capacitance, C2, is greater than the first capacitance, C1, may cause a total capacitance between the electrostatic device and the sensor matrix 328 to increase by more than 100%, as compared to a configuration of the electrostatic device in which the electrostatic device does not include the second electrode 338. Configuring the second capacitance, C2, to be greater than the first capacitance, C1, may increase the linearity of the electrostatic device and/or a height at which the electrostatic device is capable of being detected when the electrostatic device hovers over the sensor matrix 328. Configuring the second capacitance, C2, to be greater than the first capacitance, C1, may decrease latency and/or jitter associated with the electrostatic device. The aforementioned benefits resulting from the second capacitance, C2, being greater than the first capacitance, C1, may be achieved without increasing a cross-sectional area of the first electrode 336 in a plane that is perpendicular to the axis 348 (shown in FIG. 3).

Some example factors that may cause the second capacitance, C2, to be greater than the first capacitance, C1, include but are not limited to the second electrode 338 having a larger surface area than the first electrode 336 and the second electrode 338 coming closer than the first electrode 336 to certain elements of the sensor matrix 328 when the electrostatic device is tilted.

It should be noted that if not properly modeled, the designated capacitance, C12, and the second capacitance, C2, may act to increase tails of the response detected by the sensor matrix 328, which may substantially increase tilt-dependent offset errors (i.e., position errors) associated with the electrostatic device. A substantial increase of such errors may significantly degrade the user experience of a user who uses the electrostatic device. However, proper modeling can take advantage of the improved signal strength to perform tilt estimation and/or tilt-dependent error compensation.

FIG. 5 is an example circuit diagram 500 based on the equivalent model 400 shown in FIG. 4 in accordance with an embodiment. As shown in FIG. 5, circuit diagram 500 includes nodes A, B, D, E, and F. The first capacitance, C1, is coupled between nodes D and E. The second capacitance, C2, is coupled between nodes A and B. The sensor capacitance, Cd, is coupled between nodes A and D. The designated capacitance, C12, is coupled between nodes B and E. The third capacitance, C10, is coupled between nodes E and F. The fourth capacitance, C20, is coupled between nodes B and F. The drive circuit 337 is coupled between node E and an electrical ground. Node F is coupled to an electrical ground. A first voltage, V1', is a voltage at node D. A second voltage, V2', is a voltage at node A. The first voltage, V1' may be induced by the active signal, V1, that is electrostatically coupled to the sensor matrix 328 by the first electrode 336. The second voltage, V2', may be induced by a secondary signal that is electrically coupled to the sensor matrix 328 by the second electrode 338. The secondary signal may be based on the first active signal, V1.

The voltages, V1' and V2', are measurable at the sensor matrix 328. For instance, the voltages, V1' and V2', may be measured by the same sensor of the sensor matrix 328 or by different sensors of the sensor matrix 328. Tilt of the electrostatic device may be determined based on the voltages, V1' and V2'. One example technique for determining tilt of an electrostatic device is described below with reference to FIG. 6.

Figure 6:
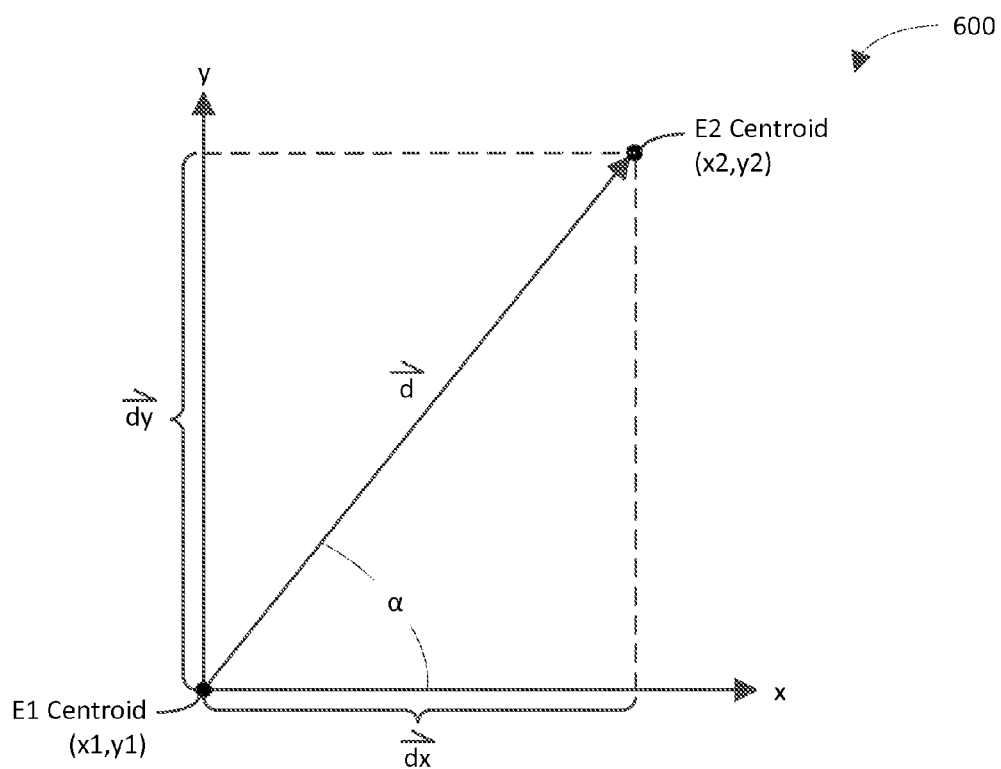
FIG. 6 is a graphical representation of tilt of an electrostatic device, as measured by a sensor matrix of a computing device, in accordance with an embodiment.

FIG. 6 is a graphical representation 600 of azimuth of an electrostatic device, as measured by a sensor matrix (e.g., sensor matrix 228 or 328) of a computing device, in accordance with an embodiment. For purposes of illustration, the graphical representation 600 will be discussed with respect to the first electrode 336 and the second electrode 338 shown in FIGS. 3-4. In FIG. 6, a location of the centroid of the first electrode 336 is labeled as "E1 Centroid," and a location of the centroid of the second electrode 338 is labeled as "E2 Centroid." The graphical representation 600 includes an X axis and a Y axis. The X and Y axes are in the plane of the sensor matrix 328. A Z axis is normal to the plane of the sensor matrix 328. The location of the centroid of the first electrode 336, E1 Centroid, is shown to be at coordinates (x1,y1). The location of the centroid of the second electrode 338, E2 Centroid, is shown to be at coordinates (x1+dx,y1+dy). Note that by definition, (x2,y2)=(x1+dx,y1+dy). It will be recognized that (x1,y1) and (x2,y2) may correspond to the respective locations on the sensor matrix 328 at which the respective voltages, V1' and V2', are measured.

The distance, d, represents a distance between the centroids of the first and second electrodes 336 and 338. The distance, dx, represents a projection of the distance, d, on the X axis. The distance, dy, represents a projection of the distance, d, on the Y axis. The distance, d, the distance dy, and/or the distance, dx, are determined by the computing device based on signals that are received from the first and second electrodes 336 and 338. On a device that can independently estimate the locations of the first and second electrodes 336 and 338, a calibration function may be produced that maps the four values (x1,y1,dx,dy) into the tilt angle, θ, of the electrostatic device with the Z axis (i.e., the axis that is normal to the plane of the sensor matrix 328). Some configurations may allow for this calibration function to be decoupled into one calibration function for the X axis and another calibration function for the Y axis. Namely, one function may map (x1,dx) into θx, the angle between the Z axis and the projection of the electrostatic device onto the XZ plane. The other function may map (y1,dy) into θy, the angle between the Z axis and the projection of the electrostatic device onto the YZ plane. These calibration functions may be defined by interpolating lookup tables or least-squares fitting. The tilt orientation, α, of the projection of the electrostatic device onto the plane of the sensor matrix 328, measured with respect to the X axis, may be calculated using the following equation:

$$\alpha = a\tan 2(dy, dx). \quad \text{(Equation 1)}$$

Figure 7:
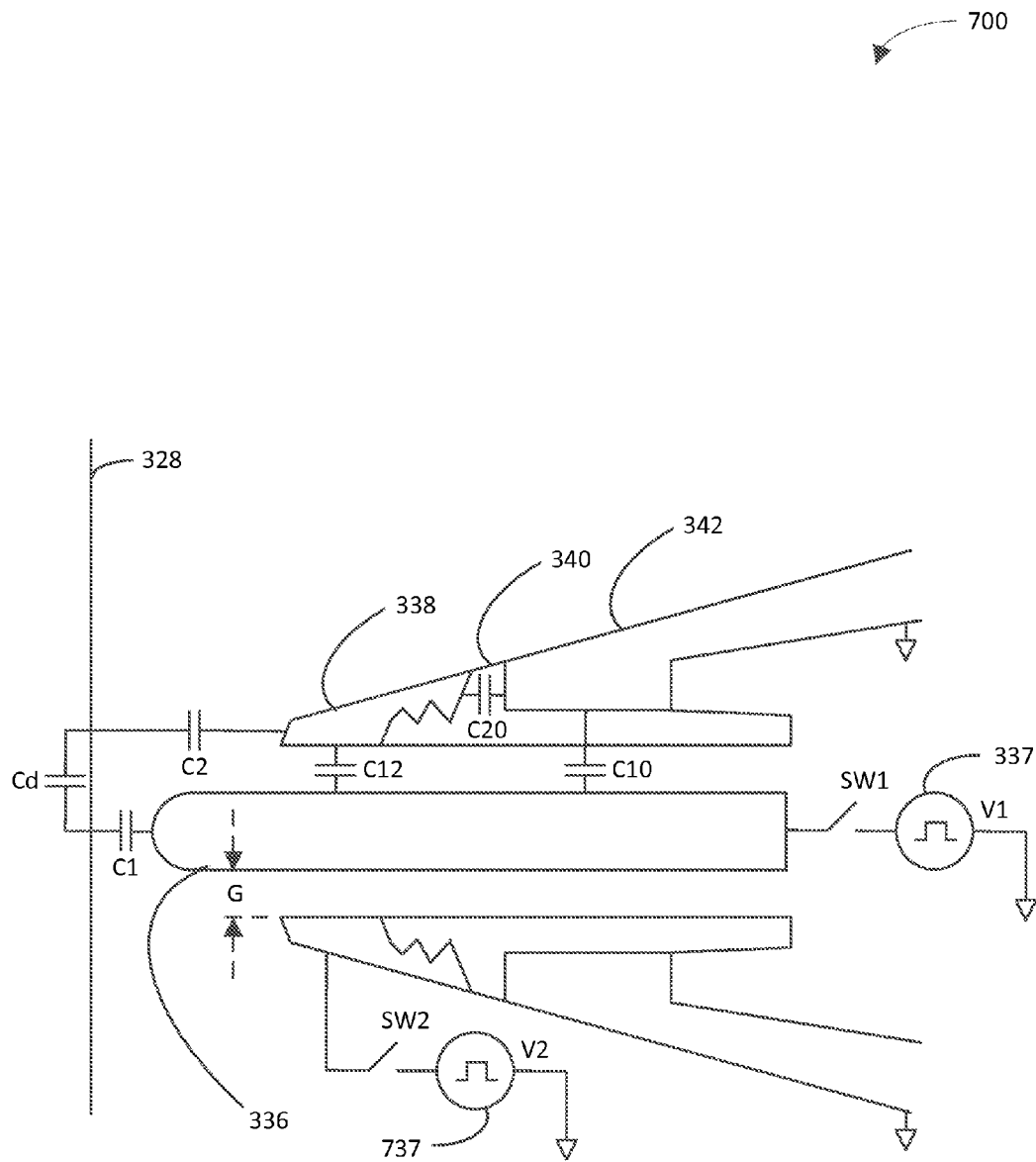
FIG. 7 is an example equivalent model of the portion of the electrostatic device shown in FIG. 3 utilizing two drive circuits in accordance with an embodiment.

FIG. 7 is an example equivalent model 700 of the portion 300 of the electrostatic device shown in FIG. 3 utilizing two drive circuits 337 and 737 in accordance with an embodiment. The equivalent model 700 is shown to include all of the components that are included in the equivalent model 400 of FIG. 4. For instance, equivalent model 700 includes a first drive circuit 337, which is configured to generate a first active signal, V1. The equivalent model 700 further includes a first switch, SW1; a second switch, SW2; and a second drive circuit 737. The first switch, SW1, is coupled between the first electrode 336 and the first drive circuit 337. The second switch, SW2, is coupled between the second electrode 338 and the second drive circuit 737. The second drive circuit 737 is configured to generate a second active signal, V2. In FIG. 7, the sensor capacitance, Cd, is between sensor(s) of the sensor matrix 328 that measure the voltages, V1' and V2'. The equivalent model 700 ignores resistances for purposes of illustration and is not intended to be limiting. It will be recognized that the sensor capacitance, Cd, may be replaced by a wire if the voltages, V1' and V2', are measured by a single sensor.

Figure 8:
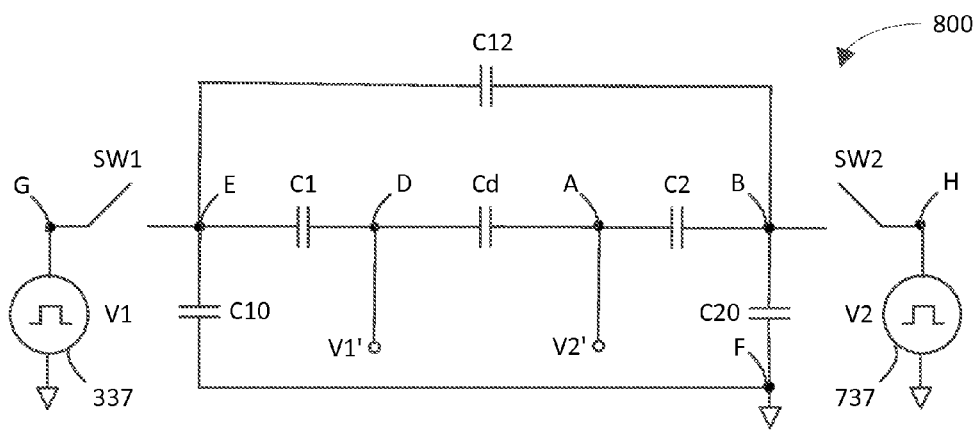
FIG. 8 is an example circuit diagram based on the equivalent model shown in FIG. 7 in accordance with an embodiment.

FIG. 8 is an example circuit diagram 800 based on the equivalent model 700 shown in FIG. 7 in accordance with an embodiment. As shown in FIG. 8, circuit diagram 800 includes nodes A, B, D, E, and F, which are also shown in the circuit diagram 500 of FIG. 5. The capacitances, C1, C2, Cd, C12, C10, and C20 are coupled among the nodes A, B, D, E, and F as described above with reference to FIG. 5. The circuit diagram 800 further includes nodes G and H. The first switch, SW1, is coupled between nodes G and E. The first drive circuit 337 is coupled between node G and an electrical ground. The second switch, SW2, is coupled between nodes B and H. The second drive circuit 737 is coupled between node H and an electrical ground.

A first voltage, V1', is a voltage at node D. A second voltage, V2', is a voltage at node A. The first voltage, V1' may be induced by the first active signal, V1, which is electrostatically coupled to the sensor matrix 328 by the first electrode 336. The second voltage, V2', may be induced by the second active signal, V2, which is electrically coupled to the sensor matrix 328 by the second electrode 338. The second active signal, V2, may be based on the first active signal, V1. The voltages, V1' and V2', are measurable at the sensor matrix 328. For instance, the voltages, V1' and V2', may be measured by the same sensor of the sensor matrix 328 or by different sensors of the sensor matrix 328.

Figure 9:
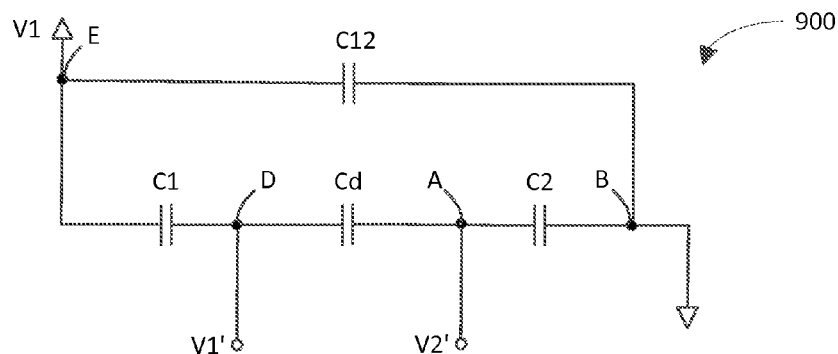
FIG. 9 is an example circuit diagram, which is equivalent to the circuit diagram shown in FIG. 8 when SW1 and SW2 are closed, V1 is driving an arbitrary voltage waveform, and V2 is driving 0V, in accordance with an embodiment.
Figure 10:
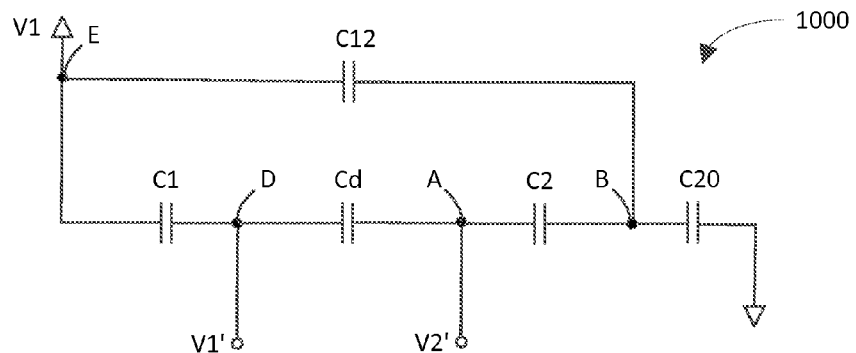
FIG. 10 is an example circuit diagram, which is equivalent to the circuit diagram shown in FIG. 8 when SW1 is closed, SW2 is open, and V1 is driving an arbitrary voltage waveform, in accordance with an embodiment.

FIGS. 9 and 10 are discussed below to show the usefulness of configuring the designated capacitance, C12, to be greater than or equal to a capacitance threshold while ensuring a detectable difference between the voltages, V1' and V2'.

FIG. 9 is an example circuit diagram 900, which is equivalent to the circuit diagram 800 shown in FIG. 8 when the first switch, SW1, and the second switch, SW2, are closed, in accordance with an embodiment. Furthermore, the first drive circuit 337 is assumed to be driving an arbitrary waveform, while the second drive circuit 737 is driving 0V. As shown in FIG. 9, circuit diagram 900 includes nodes A, B, D, and E. The capacitances, C1, C2, Cd, and C12 are coupled among the nodes A, B, D, and E as described above with reference to FIG. 8. The circuit diagram 900 does not include the third capacitance, C10, because the first drive circuit 337 is assumed to have sufficiently low output impedance and is thus not affected by capacitive loading. The circuit diagram 900 does not include the fourth capacitance, C20, because closing the second switch, SW2, shorts node B to an electrical ground potential.

FIG. 10 is an example circuit diagram 1000, which is equivalent to the circuit diagram 800 shown in FIG. 8 when the first switch, SW1, is closed and the second switch, SW2, is open, in accordance with an embodiment. Furthermore, the first drive circuit 337 is assumed to be driving an arbitrary waveform, while the second drive circuit 737 is driving 0V. As shown in FIG. 10, circuit diagram 1000 includes nodes A, B, D, and E. The capacitances, C1, C2, Cd, and C12 are coupled among the nodes A, B, D, and E as described above with reference to FIG. 8. The circuit diagram 1000 does not include the third capacitance, C10, because the first drive circuit 337 is assumed to have sufficiently low output impedance and is thus not affected by capacitive loading. The circuit diagram 1000 is different form the circuit diagram 900 shown in FIG. 9 in that the circuit diagram 1000 includes the fourth capacitance, C20, which is coupled between node B and an electrical ground potential.

With regard to FIGS. 9 and 10, it may be assumed for purposes of illustration that the first signal, V1, is an alternating current (AC) waveform and that the second signal, V2, has a fixed direct current (DC) voltage, though the scope of the example embodiments is not limited in this respect. By comparing FIGS. 9 and 10, it will be clear to a person skilled in the relevant art(s) that having the second switch, SW2, open enables more charge to be transferred from node E to nodes A and D. For instance, as shown in FIG. 9, closing the second switch, SW2, is equivalent to replacing the fourth capacitance, C20, with a wire, which attenuates the voltages, V1' and V2' and reduces the amount of charge transferred from the electrostatic device to the sensor matrix 328. An equivalent interpretation is that holding the second signal, V2, steady with the second switch, SW2, closed causes the second electrode 338 to shield an electric field that would otherwise exist between the first electrode 336 and the sensor matrix 328, thereby reducing charge transfer.

Also, configuring the designated capacitance, C12, to be greater than or equal to a capacitance threshold increases charge transfer from node E to nodes A and D and reduces an absolute difference between the voltages, V1' and V2'. In the extreme case, if the second switch, SW2, is open and the designated capacitance, C12, is relatively large with respect to the other capacitances, C1, C2, Cd, and C20, then the first and second voltages, V1' and V2', may be substantially equal, which may cause the first and second electrodes 336 and 338 to behave like a single electrically connected part. Thus, for the purpose of maximizing charge transfer it may be desirable to configure the designated capacitance, C12, to be large enough to cause an amount of charge that is transferred to nodes A and D to be greater than or equal to a threshold amount without the designated capacitance, C12, being so large that the first and second voltages, V1' and V2', are indistinguishable (e.g., incapable of being uniquely identified) by the sensor matrix 328.

It may be beneficial to control the first switch, SW1, and the second switch, SW2, such that one of the first and second drive circuits 337 and 737 transfers charge at a time. To generalize this concept, when one electrode changes state, all other electrodes may be floated (i.e., not held at a fixed potential). For instance, drive circuits associated with the other electrodes may be configured to have relatively high output impedances to cause the other electrodes to float. Causing the other electrodes to float when the one electrode changes state may enable detection of the electrostatic device at a distance of up to 10-15 mm from the sensor matrix 328; whereas, allowing more than one electrode at a time to have their respective drive circuits configured with a relatively low output impedance may reduce the distance at which the electrostatic device is detectable to approximately 3-5 mm from the sensor matrix 328. These example distances are provided for illustrative purposes and are not intended to be limiting.

It will be recognized that, in practice, switches do not close and open instantaneously. Accordingly, a suitable tolerance (e.g., tens of nanoseconds or hundreds of nanoseconds) may be utilized for controlling the switches. Moreover, electromagnetic compatibility (EMC) requirements may require transition times to be greater than or equal to a specified time threshold, which may increase an amount of time that the switches remain closed. Some example drive circuits and their corresponding timing diagrams are described below with reference to FIGS. 11-14.

Figure 11:
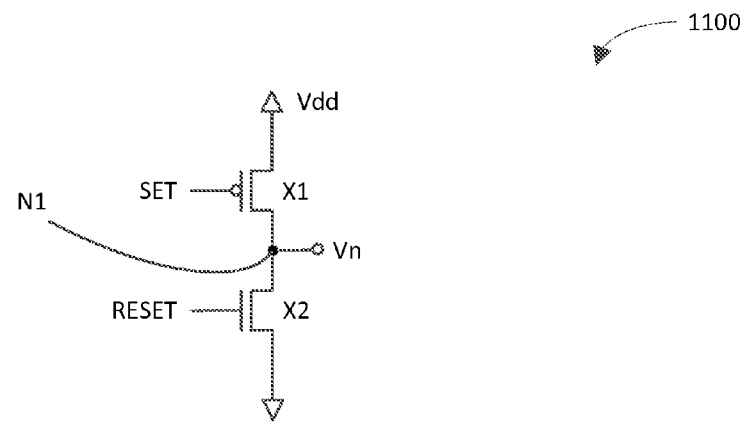
FIGS. 11 and 13 are example drive circuits for generating active signals in accordance with embodiments.

FIG. 11 is an example drive circuit 1100 for generating active signals in accordance with an embodiment. The drive circuit 1100 may be referred to as having a "push-pull configuration." For instance, the drive circuit 1100 includes a P-type transistor, X1; an N-type transistor, X2; and a node N1. The P-type transistor, X1, is coupled between a reference voltage, Vdd, and the node N1. The N-type transistor, X2, is coupled between the node N1 and an electrical ground. Each of the P-type transistor, X1, and the N-type transistor, X2, includes a gate, a source, and a drain. The P-type transistor, X1, is controlled by a SET signal at the gate of the P-type transistor, X1. The N-type transistor, X2, is controlled by a RESET signal at the gate of the N-type transistor, X2. The drive circuit 1100 provides an active signal, Vn, at the node N1. The active signal may be the first active signal, V1, described above with reference to FIGS. 4-5 and 7-10; the second active signal, V2, described above with reference to FIGS. 7-8; or other active signal.

Figure 12:
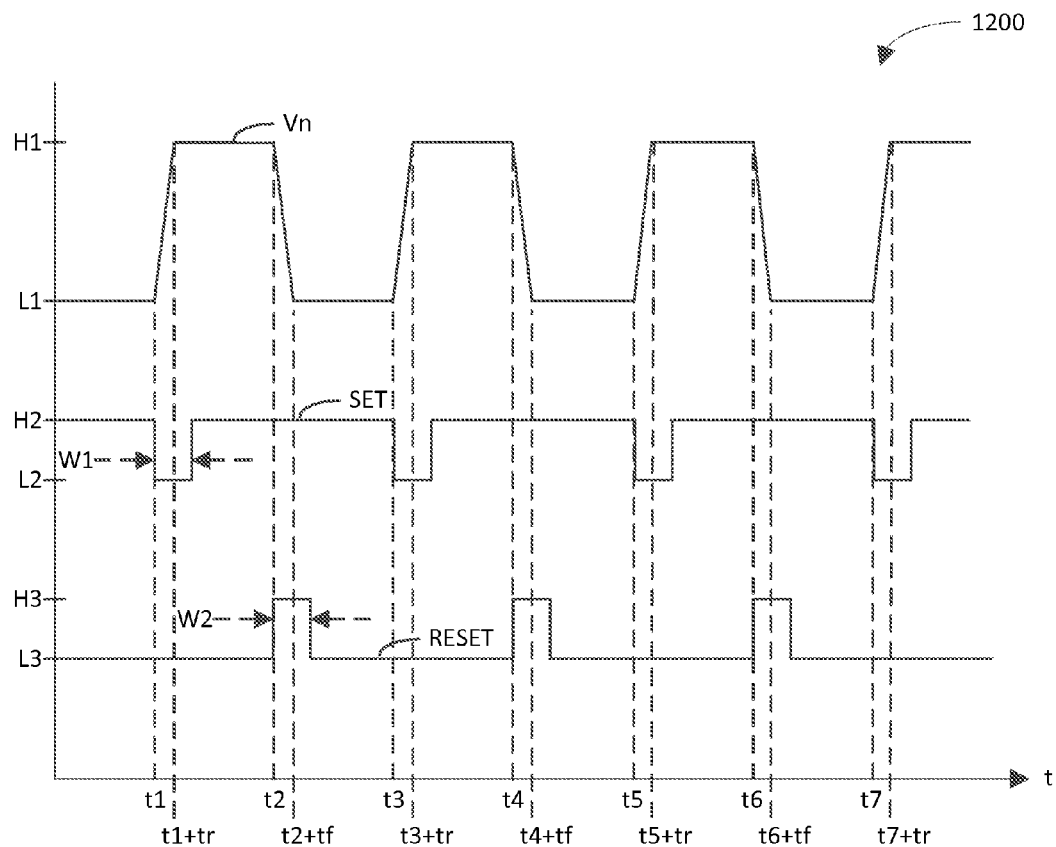
FIGS. 12 and 14 are timing diagrams associated with the drive circuits shown in FIGS. 11 and 13, respectively, in accordance with embodiments.

FIG. 12 is a timing diagram 1200 associated with the drive circuit 1100 shown in FIG. 11 in accordance with an embodiment. The timing diagram 1200 shows timing of transitions between high and low states for each of the active signal, Vn, the SET signal, and the RESET signal described above with reference to FIG. 11. The active signal, Vn, initiates transitions from a low state, L1, to a high state, H1, at times t1, t3, t5, and t7. These transitions are completed at times t1+tr, t3+tr, t5+tr, and t7+tr. The active signal, Vn, initiates transitions from the high state, H1, to the low state, L1, at times t2, t4, and t6. These transitions are completed at times t2+tf, t4+tf, and t6+tf. The SET signal is configured to turn on (i.e., close) the P-type transistor, X1, for a duration indicated by a time window, W1, which surrounds each of the transitions of the active signal, Vn, from the low state, L1, to the high state, H1. In this example, W1>tr, such that the P-type transistor, X1, is on long enough for Vn to settle at Vdd. Accordingly, the SET signal is configured to be in a low state, L2, for the duration of each time window, W1, and in a high state, H2, otherwise. The RESET signal is configured to turn on (i.e., close) the N-type transistor, X2, for a duration indicated by a time window, W2, which surrounds each of the transitions of the active signal, Vn, from the high state, H1, to the low state, L1. In this example, W2>tf, such that the N-type transistor, X2, is on long enough for Vn to settle at 0V. Accordingly, the SET signal is configured to be in a high state, H3, for the duration of each time window, W2, and in a low state, L3, otherwise. The duration of each of the time windows, W1 and W2, may be any suitable value (e.g., in a range between 1 nanosecond and 10 microseconds). For instance, the time windows, W1 and W2, may be configured to be just long enough to capture the entirety of the corresponding transition and for the transition to become stable.

Figure 13:
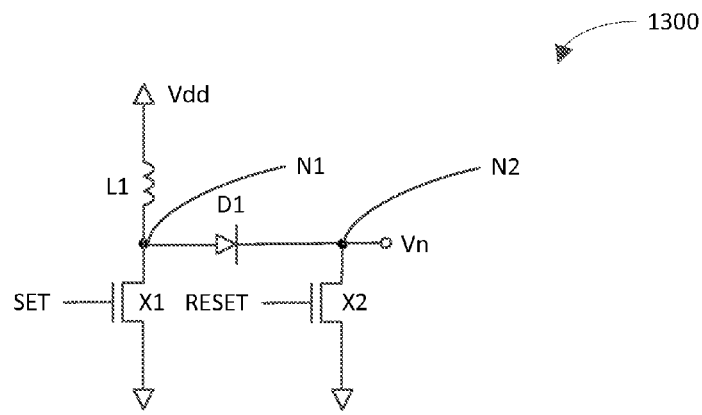

FIG. 13 is another example drive circuit 1300 for generating active signals in accordance with an embodiment. The drive circuit 1300 may be referred to as an "inductive boost circuit." For instance, the drive circuit 1300 includes an inductor, L; a first N-type transistor, X1; a second N-type transistor, X2; a diode, D1; a first node N1; and a second node N2. The inductor, L1, is coupled between a reference voltage, Vdd, and the first node N1. The first N-type transistor, X1, is coupled between the first node N1 and an electrical ground potential. An anode of the diode, D1, is coupled to the first node, N1, and a cathode of the diode, D1, is coupled to the second node, N2. The second N-type transistor, X2, is coupled between the second node, N2, and an electrical ground potential. Each of the first and second N-type transistors, X1 and X2, includes a gate, a source, and a drain. The first N-type transistor, X1, is controlled by a SET signal at the gate of the first N-type transistor, X1. The second N-type transistor, X2, is controlled by a RESET signal at the gate of the second N-type transistor, X2. The drive circuit 1100 provides an active signal, Vn, at the second node N2. The active signal may be the first active signal, V1, described above with reference to FIGS. 4-5 and 7-10; the second active signal, V2, described above with reference to FIGS. 7-8; or other active signal.

Figure 14:
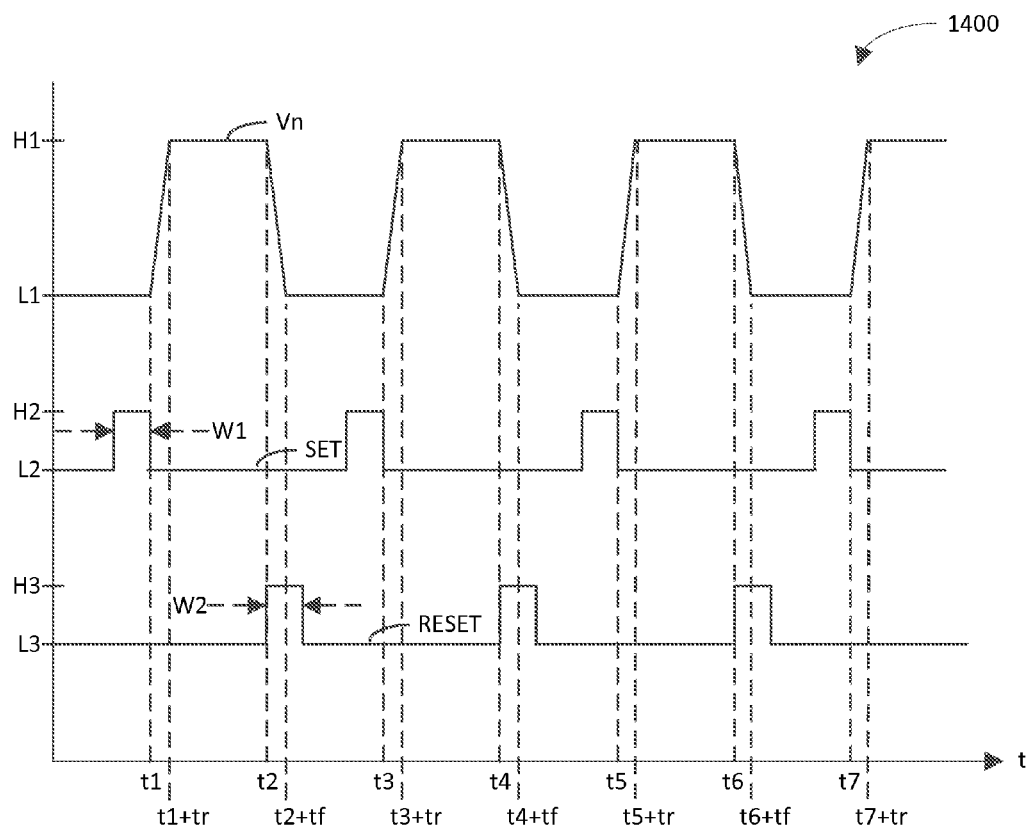

FIG. 14 is a timing diagram 1400 associated with the drive circuit 1300 shown in FIG. 13 in accordance with an embodiment. The timing diagram 1400 shows timing of transitions between high and low states for each of the active signal, Vn, the SET signal, and the RESET signal described above with reference to FIG. 13. The active signal, Vn, initiates transitions from a low state, L1, to a high state, H1, at times t1, t3, t5, and t7. These transitions are completed at times t1+tr, t3+tr, t5+tr, and t7+tr. The active signal, Vn, initiates transitions from the high state, H1, to the low state, L1, at times t2, t4, and t6. These transitions are completed at times t2+tf, t4+tf, and t6+tf. The SET signal is configured to turn on (i.e., close) the first N-type transistor, X1, for a duration indicated by a time window, W1. At the end of this window, the first N-type transistor, X1, is commanded to turn off, causing the inductor, L1, to boost the voltage at node N1, initiating the transition of the active signal, Vn, from the low state, L1, to the high state, H1. Accordingly, the SET signal is configured to be in a high state, H2, for the duration of each time window, W1, and in a low state, L2, otherwise. Note that for this inductive boost circuit, the duration of W1 is determined by how much energy to store in the inductor, L1, and has no relation to the rise time tr. The RESET signal is configured to turn on (i.e., close) the second N-type transistor, X2, for a duration indicated by a time window, W2, which surrounds each of the transitions of the active signal, Vn, from the high state, H1, to the low state, L1. In this example, W2>tf, such that the second N-type transistor, X2, is on long enough for Vn to settle at 0V. Accordingly, the SET signal is configured to be in a high state, H3, for the duration of each time window, W2, and in a low state, L3, otherwise.

Another technique for preventing electrodes from having simultaneous transitions is to drive the electrodes with phase shifts. For instance, with regard to the first active signal, V1, and the second active signal, V2, shown in FIG. 7, the first active signal, V1, and the second active signal, V2, may be amplitude modulated with a specified phase shift with respect to each other. Assuming the transitions of V1 and V2 occur at integer multiples of the same temporal interval and are sufficiently fast, then a suitable phase shift will prevent the transitions of V1 and V2 from overlapping in time. The specified phase shift may be 30 degrees, 60 degrees, 90 degrees, or other suitable value. For cases in which an electrostatic device has more than two electrodes, appropriate phase shifts may be applied to the active signals that are to be provided to the electrodes so that each active signal does not transition simultaneously with another of the active signals. It will be recognized that CDMA modulation may be implemented with this technique because time-shifted pseudo-random sequences are mutually orthogonal.

The embodiments described above have been discussed with reference to electrostatic devices having two electrodes for illustrative purposes and are not intended to be limiting. It will be recognized that the embodiments are applicable to electrostatic devices that include more than two electrodes. It will be further recognized that the embodiments are applicable to electrostatic devices that include more than two drive circuits.

For an electrostatic device that includes N electrodes, a sum of the capacitances between the sensor matrix and the respective second through Nth electrodes may be greater than the capacitance between the sensor matrix and the first electrode. The capacitance between the first electrode and each of the second through Nth electrodes may be configured to cause voltages that are induced by the respective electrodes of the electromagnetic device and that are measurable at the sensor matrix to be greater than or equal to a voltage threshold while causing an absolute difference between the voltage induced by the first electrode and the voltage induced by each of the second through Nth electrodes to be detectable by the sensor matrix.

The electrostatic device may be configured such that while one drive circuit is transferring charge (e.g., has low output impedance, which may be modeled as a closed switch), the other drive circuits are floating their respective electrodes (e.g., have high output impedances, which may be modeled as open switches). It will also be recognized that more than two electrodes may be used to estimate twist of an electrostatic device. For example, the electrostatic device may have a tip electrode (e.g., along a center axis of the electrostatic device) and a ring electrode (e.g., surrounding at least a portion of the tip electrode). The ring electrode may be partitioned into sections (e.g., halves or quadrants), any of which may or may not be driven independently. In accordance with this example, the sections of the ring electrode may produce corresponding centroids whose offsets with respect to the tip electrode may be jointly mapped to tilt and twist angles.

FIG. 15A is a cross-sectional view of an example electrostatic device 1500 in accordance with an embodiment. Electrostatic device 1500 includes a member 1544, a first electrode 1508A, drive circuit(s) 1546, and a second electrode 1508B. The member 1544 has a proximal end, P, and a distal end, D, at opposing ends of an axis 1548. The member 1544 may be a rigid or semi-rigid body. The member 1544 may have a size and/or a shape of a conventional writing pen or a conventional mechanical eraser, though the scope of the example embodiments is not limited in this respect. For instance, the member 1544 may be approximately 150 mm long and approximately 10 mm in diameter or a different size and/or shape.

The first electrode 1508A is positioned at the proximal end, P, of the member 1544. The first electrode 1508A is configured to electrostatically couple a principal signal (e.g., first active signal V1) to a sensor matrix 1528 of a computing device (e.g., computing device 102 or 200), such that an intensity of the principal signal that is sensed by the sensor matrix 1528 increases as the first electrode 1508A approaches (e.g., gets near or approximates) the sensor matrix 1528. In one example implementation, the first electrode 1508A may be configured to electrostatically couple the principal signal to the sensor matrix 1528 in accordance with a writing operation. For instance, the writing operation may be configured to cause writing to be displayed at a location on a display of the computing device that corresponds to a location of the first electrode 1508A that is detected by the sensor matrix 1528. In another example implementation, the first electrode 1508A may be configured to electrostatically couple the principal signal to the sensor matrix 1528 in accordance with an erasure operation. For instance, the erasure operation may be configured to cause an erasure to occur at a location on the display of the computing device that corresponds to the location of the first electrode 1508A that is detected by the sensor matrix 1528. It will be recognized that the electrostatic coupling of the principal signal to the sensor matrix 1528 by the first electrode 1508A need not be in accordance with a writing operation or an erasure operation.

The drive circuit(s) 1546 are configured to generate the principal signal. The principal signal is an active signal.

The second electrode 1508B is positioned a spaced distance from the first electrode 1508A. The spaced distance is configured to cause a designated capacitance (e.g., designated capacitance C12) between the first electrode 1508A and the second electrode 1508B to exceed a capacitance threshold. For instance, the spaced distance may be configured to cause the designated capacitance to exceed the capacitance threshold to optimize a figure of merit with regard to the electrostatic device 1500. The figure of merit may be a signal-to-noise ratio (SNR) or a signal strength associated with the electrostatic device 1500. The SNR may be an SNR of a tilt estimate, an SNR of a tip location estimate, or a combined estimate of location and tilt angle of the electrostatic device 1500. The capacitance threshold may be predetermined. The spaced distance is further configured to cause the second electrode 1508B to electrostatically couple a secondary signal (e.g., second active signal V2), which is based on the principal signal, to the sensor matrix 1528 as the first electrode 1508A is placed proximate the sensor matrix 1528.

An estimated location of the first electrode 1508A on the sensor matrix 1528, as detected by the sensor matrix 1528, is represented by a first location, X1. For instance, the first location, X1, may correspond to the electrical centroid of the first electrode 1508A on the sensor matrix 1528. An estimated location of the second electrode 1508B on the sensor matrix 1528, as detected by the sensor matrix 1528, is represented by a second location X2. For instance, the second location, X2, may correspond to the electrical centroid of the second electrode 1508B on the sensor matrix 1528. As shown in FIG. 15A, the electrical centroid of the first electrode 1508A is closer than the electrical centroid of the second electrode 1508B to the proximal end, P, of the member 1544. Accordingly, the first location, X1, is closer than the second location, X2, to the proximal end, P, of the member 1544.

The first electrode 1508A is configured to be a tip electrode, which extends along a portion of the axis 1548, for non-limiting illustrative purposes. The second electrode 1508B is configured to be a ring electrode that surrounds a portion of the first electrode 1508A for non-limiting illustrative purposes. It will be recognized that the first and second electrodes 1508A and 1508B may be any suitable size and shape and may have any suitable orientation in the electrostatic device 1500.

In a first embodiment, the principal signal is configured to induce a first voltage that is measurable at the sensor matrix 1528. In accordance with this embodiment, the secondary signal is configured to induce a second voltage that is measurable at the sensor matrix 1528. In further accordance with this embodiment, the spaced distance is further configured to cause an absolute difference between the first voltage and the second voltage to exceed a voltage threshold.

In a second embodiment, the first electrode 1508A and the second electrode 1508B are configured such that a second capacitance (e.g., second capacitance C2) between the second electrode 1508B and the sensor matrix 1528 is greater than a first capacitance between the first electrode 1508A and the sensor matrix 1528. For example, the second electrode 1508B may be configured to be larger than the first electrode 1508A.

In a third embodiment, the second electrode 1508B is configured to be a passive slug. A passive slug is conductive material that is not directly driven by an active signal. However, a passive slug may be indirectly driven by an active signal. For instance, an active signal that directly or indirectly drives another electrode may be electrostatically coupled to the passive slug, thereby indirectly driving the passive slug. In accordance with this embodiment, the drive circuit(s) 1546 do not directly drive the second electrode 1508B.

In a fourth embodiment, a function of the principal signal and the secondary signal as measured by the sensor matrix 1528 estimates a tilt angle, θ, of the electrostatic device 1500 with respect to a vector 1550 that is normal to a plane in which the sensor matrix 1528 is defined.

In a fifth embodiment, the drive circuit(s) 1546 include a first drive circuit and a second drive circuit. The first drive circuit is configured to generate the principal signal. The second drive circuit is configured to generate an auxiliary signal (i.e., a second active signal). In accordance with this embodiment, the second electrode 1508B is configured to electrostatically couple the auxiliary signal to the sensor matrix 1528 as the first electrode 1508A is placed proximate the sensor matrix 1528. In further accordance with this embodiment, a function of the principal signal and the auxiliary signal as measured by the sensor matrix 1528 estimates the tilt angle, θ, of the electrostatic device 1500 with respect to the vector 1550 that is normal to the plane in which the sensor matrix 1528 is defined.

In an aspect of the fifth embodiment, the first drive circuit may be configured to have a relatively low output impedance during a first time period in which the principal signal is provided to the sensor matrix 1528. In accordance with this aspect, the second drive circuit is configured to have a relatively low output impedance during a second time period in which the secondary signal is coupled to the sensor matrix 1528. In further accordance with this aspect, the first drive circuit is configured to have a relatively high output impedance during the second time period. In further accordance with this aspect, the second drive circuit is configured to have a relatively high output impedance during the first time period.

In another aspect of the fifth embodiment, the auxiliary signal may be phase shifted with respect to the principal signal, such that the auxiliary and principal signals do not transition simultaneously. For example, the auxiliary signal may be phase shifted by 30 degrees, 60 degrees or 90 degrees with respect to the principal signal. In another example, the auxiliary signal may be phase shifted in combination with a CDMA modulation technique.

In a sixth embodiment, the second electrode 1508B surrounds at least a portion (e.g., an entirety) of the first electrode 1508A in a plane that is perpendicular to the axis 1548.

FIG. 15B is an end view of the electrostatic device 1500 shown in FIG. 15A in accordance with an embodiment. As shown in FIG. 15B, the first electrode 1508A is configured as a tip electrode, which is coincident with the axis 1548, for non-limiting illustrative purposes. The second electrode 1508B is configured as a ring electrode that surrounds the first electrode 1508B for non-limiting illustrative purposes. A twist angle, β, of the electrostatic device 1500 about the axis 1548 is also depicted in FIG. 15B. The twist angle, β, indicates an amount of rotation of the electrostatic device 1500 about the axis 1548 with reference to a point in a plane that is perpendicular to the axis 1548.

FIG. 16A is a cross-sectional view of another example electrostatic device 1600 in accordance with an embodiment. Electrostatic device 1600 includes a member 1644 and drive circuit(s) 1646, which are operable in a manner similar to the member 1544 and the drive circuit(s) 1546 shown in FIG. 15. The member 1644 has a proximal end, P, and a distal end, D, at opposing ends of an axis 1648. Electrostatic device 1600 further includes a first electrode 1608A, a second electrode 1608B, and a third electrode 1608C.

The first electrode 1608A is positioned at the proximal end, P, of the member 1644. The first electrode 1608A is configured to electrostatically couple a principal signal (e.g., first active signal V1) to a sensor matrix 1628 of a computing device (e.g., computing device 102 or 200).

Each of the second electrode 1608B and the third electrode 1608C is positioned a respective spaced distance from the first electrode 1608A. The spaced distances are configured to cause designated capacitances between the first electrode 1608A and the respective second and third electrodes 1608B and 1608C to exceed a capacitance threshold. The spaced distances are further configured to cause the second and third electrodes 1608B and 1608C to electrostatically couple respective secondary signals, which are based on the principal signal, to the sensor matrix 1628 as the first electrode 1608A is placed proximate the sensor matrix 1628.

An estimated location of the first electrode 1608A on the sensor matrix 1628, as detected by the sensor matrix 1628, is represented by a first location, X1. An estimated location of the second electrode 1608B on the sensor matrix 1628, as detected by the sensor matrix 1628, is represented by a second location, X2. An estimated location of the third electrode 1608C on the sensor matrix 1628, as detected by the sensor matrix 1628, is represented by a third location, X3.

In a first embodiment, the principal signal is configured to induce a first voltage that is measurable at the sensor matrix 1628. In accordance with this embodiment, the secondary signals associated with the respective second and third electrodes 1608B and 1608C are configured to induce respective second voltages that are measurable at the sensor matrix 1628. In further accordance with this embodiment, each spaced distance is further configured to cause an absolute difference between the first voltage and the respective second voltages to exceed a voltage threshold.

In a second embodiment, the first electrode 1608A, the second electrode 1608B, and the third electrode 1608C are configured such that a sum of capacitances between the sensor matrix 1528 and the respective second and third electrodes 1608B and 1608C is greater than a capacitance (e.g., first capacitance C1) between the first electrode 1608A and the sensor matrix 1628.

In a third embodiment, at least one of the second and third electrodes 1608B and 1608C is configured to be a passive slug. In accordance with this embodiment, if one of the second and third electrodes 1608B and 1608C is configured to be a passive slug, then the other one of the second and third electrodes 1608B and 1608C may be configured to be driven by an active signal.

In a fourth embodiment, a function of the principal signal and at least one of the secondary signals as measured by the sensor matrix 1628 estimates a tilt angle, θ, of the electrostatic device 1600 with respect to a vector 1650 that is normal to a plane in which the sensor matrix 1628 is defined.

In a fifth embodiment, the drive circuit(s) 1546 include a first drive circuit and second drive circuit(s). The first drive circuit is configured to generate the principal signal. The second drive circuit(s) are configured to generate respective auxiliary signal(s), which are respective second active signal(s). In accordance with this embodiment, the second electrode 1608B and/or the third electrode 1608C is configured to electrostatically couple the respective auxiliary signal(s) to the sensor matrix 1628 as the first electrode 1608A is placed proximate the sensor matrix 1628. In further accordance with this embodiment, a function of the principal signal and at least one of the auxiliary signal(s) as measured by the sensor matrix 1628 estimates the tilt angle, θ, of the electrostatic device 1600 with respect to the vector 1650 that is normal to the plane in which the sensor matrix 1628 is defined. In further accordance with this embodiment, a function of the principal signal and at least one of the auxiliary signal(s) as measured by the sensor matrix 1628 estimates the twist angle, β, of the electrostatic device 1600 with respect to the axis 1648. The twist angle, β, of the electrostatic device 1600 is shown in FIG. 16B, which is discussed in further detail below.

In an aspect of the fifth embodiment, the first drive circuit may be configured to have a relatively low output impedance during a first time period in which the principal signal is coupled to the sensor matrix 1628. In accordance with this aspect, the second drive circuit(s) are configured to have a relatively low output impedance during respective second time period(s) in which the respective secondary signal(s)

are coupled to the sensor matrix 1628. In further accordance with this aspect, the first drive circuit is configured to have a relatively high output impedance during the second time period(s). In further accordance with this aspect, each second drive circuit is configured to have a relatively high output impedance during the first time period and during each of the second time period(s) (when the respective secondary signal is not coupled to the sensor matrix 1628).

In another aspect of the fifth embodiment, each auxiliary signal may be phase shifted with respect to the principal signal and with respect to each other auxiliary signal, such that none of the auxiliary and principal signals transition simultaneously. For example, if the second drive circuit(s) include a single drive circuit, which corresponds to one of the second and third electrodes 1608B and 1608C, the phase shift may be 180/2=90 degrees. In another example, if the second drive circuit(s) include two drive circuits, which correspond to the respective second and third electrodes 1608B and 1608C, the phase shift may be 180/3=60 degrees. These phase shifts may be combined with a CDMA modulation technique, though the scope of the example embodiments is not limited in this respect.

In a sixth embodiment, the second and third electrodes 1608B and 1608C are included in a segmented ring that surrounds at least a portion (e.g., an entirety) of the first electrode 1608A in a plane that is perpendicular to the axis 1648.

FIG. 16B is an end view of the electrostatic device 1600 shown in FIG. 16A in accordance with an embodiment. As shown in FIG. 16B the second and third electrodes 1608B and 1608C form respective segments of a segmented ring that surrounds the first electrode 1608A. The twist angle, β, indicates an amount of rotation of the electrostatic device 1600 about the axis 1648 with reference to a point in a plane that is perpendicular to the axis 1648.

FIG. 17 is a cross-sectional view of another example electrostatic device 1700 in accordance with an embodiment. Electrostatic device 1700 includes a first electrode 1708A, a second electrode 1708B, a member 1844, and drive circuit(s) 1746, which are operable in a manner similar to the first electrode 1508A, the second electrode 1508B, the member 1544, and the drive circuit(s) 1546 shown in FIG. 15. For instance, the first electrode 1708A is configured to electrostatically couple a principal signal to a sensor matrix of a computing device, and the second electrode 1708B is configured to electrostatically couple a secondary signal, which is based on the principal signal, to the sensor matrix. The principal signal induces a first voltage that is measurable at the sensor matrix. The secondary signal induces a second voltage that is measurable at the sensor matrix. The member 1744 has a proximal end, P, and a distal end, D, at opposing ends of an axis 1748.

Electrostatic device 1700 further includes an impedance component 1752, which is electrically connected between the first electrode 1708A and the second electrode 1708B. The impedance component 1752 is configured to provide a designated impedance that is less than an impedance threshold while causing an absolute difference between a first voltage and a second voltage to exceed a voltage threshold. The first voltage is induced by an active signal that is electrostatically coupled to a sensor matrix by the first electrode 1708A. The second voltage is induced by a secondary signal that is electrically coupled to the sensor matrix by the second electrode 1708B. The impedance component may include a resistor and/or a capacitor.

Figure 18:
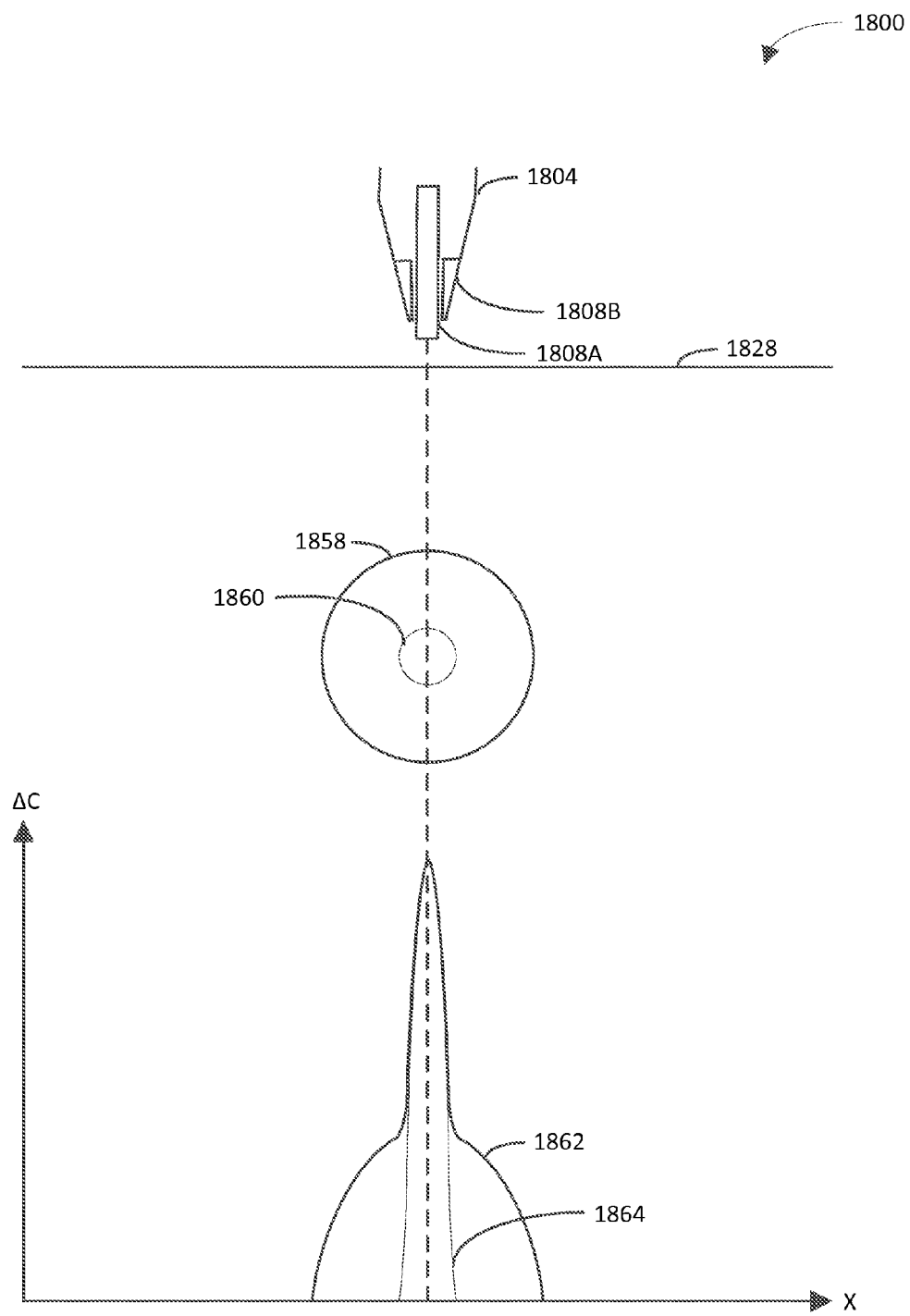

FIGS. 18-21 are illustrations 1800, 1900, 2000, and 2100 showing generation of capacitance maps in accordance with embodiments. As shown in FIG. 18, an electrostatic device 1804 includes a first electrode 1808A and a second electrode 1808B. The first and second electrodes 1808A and 1808B are separated by a spaced distance and/or connected by an impedance component, such as a resistor or a capacitor. The electrostatic device 1804 further includes a single drive circuit, which is electrically connected to the first electrode 1808A.

As depicted in FIG. 18, the electrostatic device 1804 is placed proximate a sensor matrix 1828 while the electrostatic device 1804 is orthogonal to the sensor matrix 1828, causing a first capacitance map, which corresponds to capacitance changes that are detected by sensors of the sensor matrix 1828, to be generated. A top view of the first capacitance map is represented by a first shape 1858. A top view of a second capacitance map, which would result in absence of the second electrode 1808B (e.g., in a conventional electrostatic device), is represented by a second shape 1860 for purposes of comparison. A side view of the first capacitance map is represented by a first curve 1862. A side view of the second capacitance map is represented by a second curve 1864 for purposes of comparison. The first and second curves 1862 and 1864 are shown in an XY plot, where the X axis represents distance along a surface of the sensor matrix 1828 and the Y axis represents change of capacitance (ΔC).

As can be seen in FIG. 18, the first capacitive map is larger than the second capacitive map due to the addition of the second electrode 1808B. The increased size of the first capacitance map, as compared to the second capacitance map, may increase an effective area of the first electrode 1808A and/or amplify a signal that is coupled to the touch screen 1828 by the electrostatic device 1804. For instance, the additional signal strength may provide additional noise immunity (e.g., a higher signal-to-noise ratio) for the electrostatic device 1804 and/or enable detection of the electrostatic device 1804 at a greater hover height with respect to the signal matrix 1828.

Figure 19:
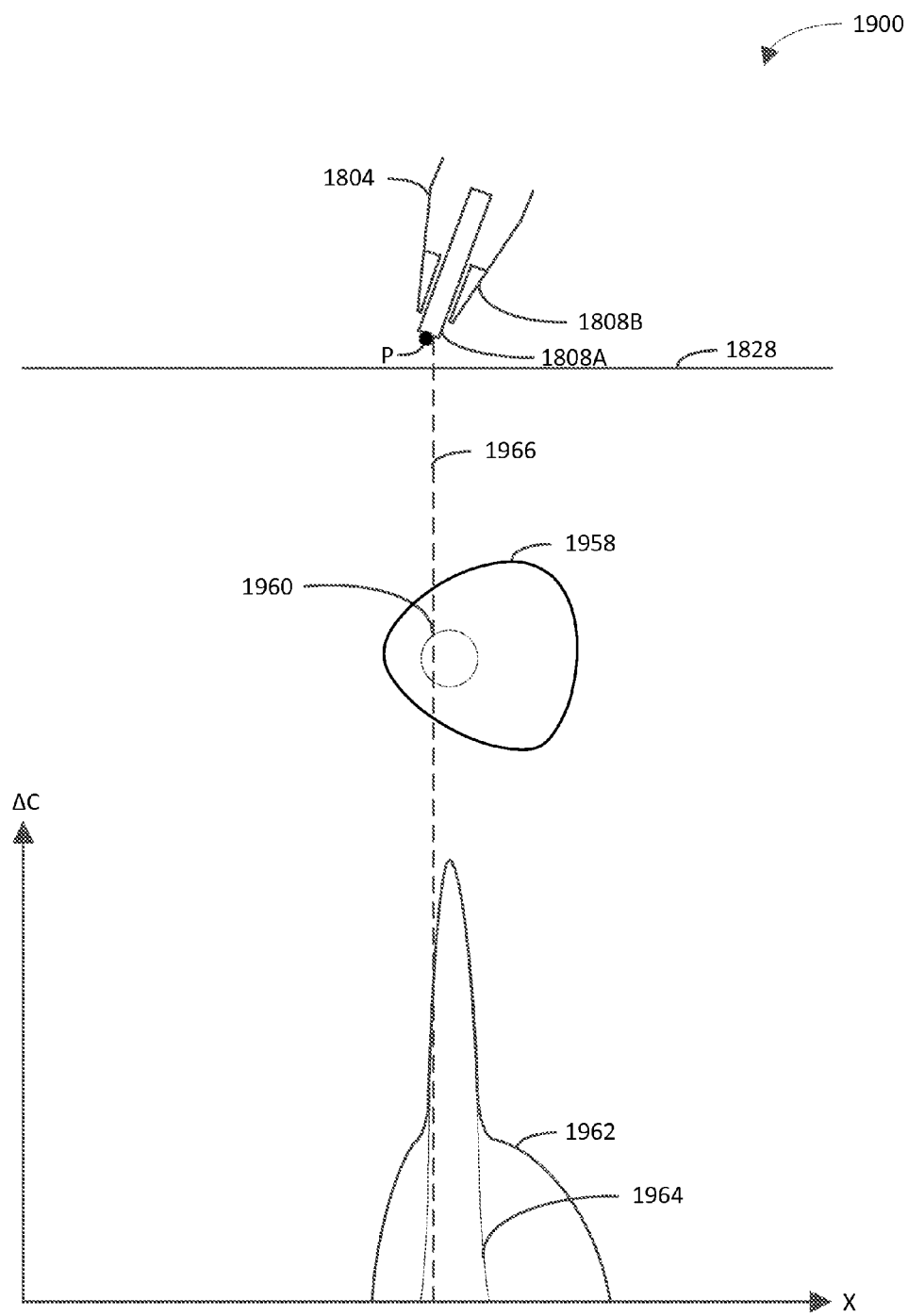

FIG. 19 shows the electrostatic device 1804 of FIG. 18 being placed proximate the sensor matrix 1828 while the electrostatic device 1804 is not orthogonal to the sensor matrix 1828, causing a third capacitance map, which corresponds to capacitance changes that are detected by the sensors of the sensor matrix 1828, to be generated. A top view of the third capacitance map is represented by a third shape 1958. A top view of a fourth capacitance map, which would result in absence of the second electrode 1808B (e.g., in a conventional electrostatic device), is represented by a fourth shape 1960 for purposes of comparison. A side view of the third capacitance map is represented by a third curve 1962. A side view of the fourth capacitance map is represented by a fourth curve 1964 for purposes of comparison. The third and fourth curves 1962 and 1964 are shown in an XY plot, where the X axis represents distance along the surface of the sensor matrix 1828 and the Y axis represents change of capacitance (ΔC).

The fourth capacitive map depicted in FIG. 19 is substantially the same as the second capacitive map depicted in FIG. 18, meaning that the capacitive map for an electrostatic device having a single electrode does not significantly change as the electrostatic device is tilted from an orthogonal position with respect to the sensor matrix 1828. The second capacitive map merely moves to a different location on the XY plane to provide the fourth capacitive map. Accordingly, an algorithm for determining tilt of an electrostatic device may not be capable of distinguishing a true pen movement from a tilt for an electrostatic device that includes a single electrode. For an electrostatic device (e.g., electrostatic device 1804) having two or more electrodes, the capacitive response becomes asymmetrical about an axis containing its peak (point of maximum amplitude) as the electrostatic device is tilted. The amount of asymmetry increases as the tilt increases. For example, as the electrostatic device tilts to the right, the capacitive map becomes longer and wider on the right side, as shown in FIG. 19. This degree of asymmetry and/or the shape of the capacitive map can be quantified by a variety of methods, and used to estimate the tilt angle.

It also should be noted that as the electrostatic device is tilted, the peak (point of maximum amplitude) of its capacitive map no longer coincides with the point where the tip touches or hovers over the display glass, indicated by line 1966. Knowledge of the tilt angle can be used to produce a correct estimate of the electrostatic device tip location, P.

Figure 20:
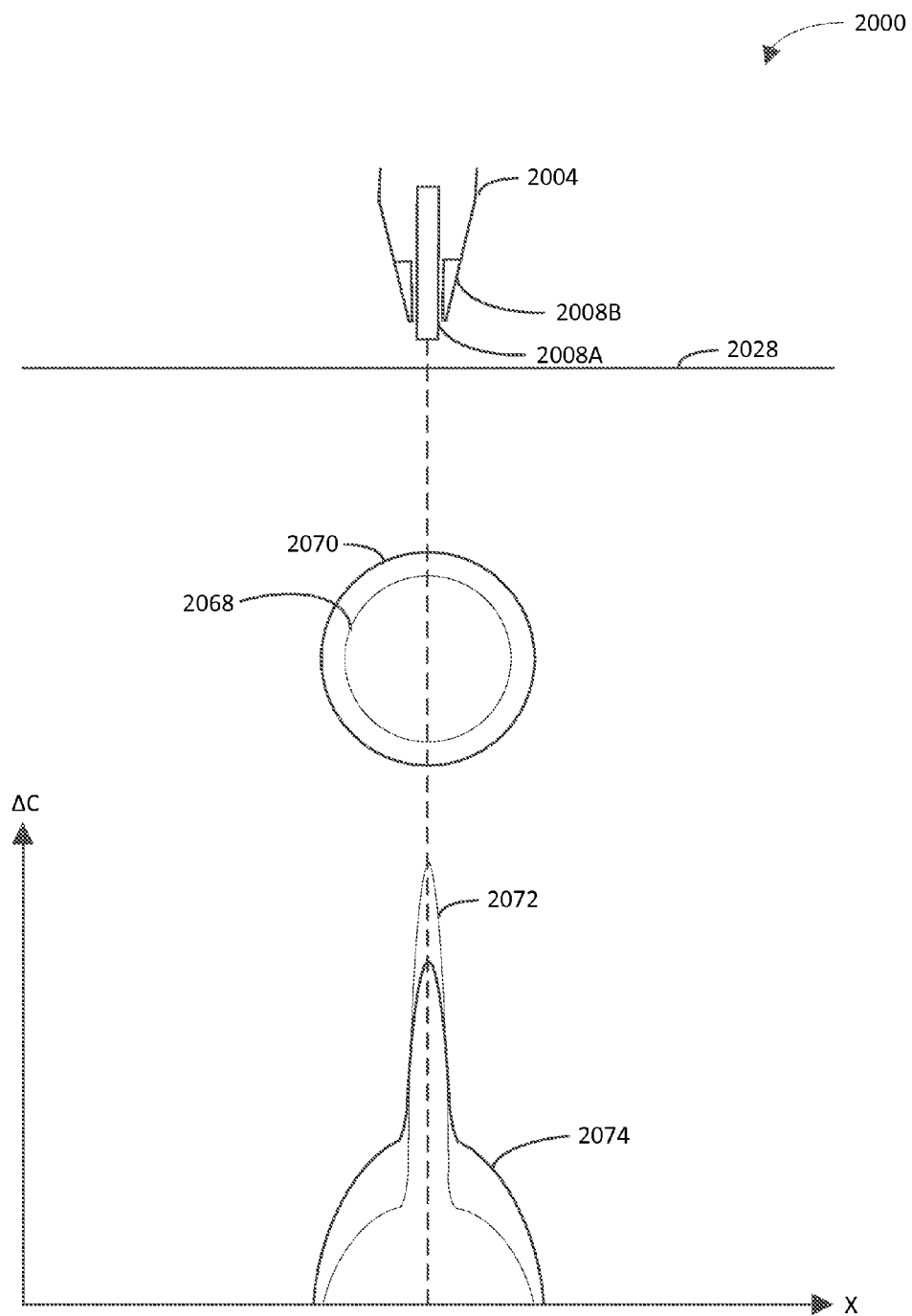

In FIG. 20, an electrostatic device 2004 includes a first electrode 2008A and a second electrode 2008B. The first and second electrodes 2008A and 2008B are separated by a spaced distance and/or connected by an impedance component, such as a resistor or a capacitor. The electrostatic device 2004 further includes first and second drive circuits, which are electrically connected to the respective first and second electrodes 2008A and 2008B.

As depicted in FIG. 20, the electrostatic device 2004 is placed proximate a sensor matrix 2028 while the electrostatic device 2004 is orthogonal to the sensor matrix 2028. Two scenarios are depicted in FIG. 20. In the first scenario, the first drive circuit is active, and the second drive circuit is not active. In the first scenario, placing the electrostatic device 2004 proximate the sensor matrix 2028 causes a first capacitance map to be generated. A top view of the first capacitance map is represented by a first shape 2068. A side view of the first capacitance map is represented by a first curve 2072.

In the second scenario, the first drive circuit is not active, and the second drive circuit is active. In the second scenario, placing the electrostatic device 2004 proximate the sensor matrix 2028 causes a second capacitance map to be generated. A top view of the second capacitance map is represented by a second shape 2070. A side view of the second capacitance map is represented by a second curve 2074.

The first and second curves 2072 and 2074 are shown in an XY plot, where the X axis represents distance along a surface of the sensor matrix 2028 and the Y axis represents change of capacitance ($\Delta C$). Due to the intentional coupling between the first and second electrodes 2008A and 2008B, the first capacitance map has wider coverage than the response of an electrostatic device that includes a single electrode, which is illustrated by the top view 1860 and the side view 1864 in FIG. 18 and the top view 1960 and the side view 1964 in FIG. 19. This increases signal strength while maintaining the detectability of the peak location (e.g., with other benefits described herein). The second capacitance map has a peak that coincides with the peak of the first capacitance map. This also contributes signal strength to the second capacitance map (e.g., with other benefits described herein).

The capacitance between the first and second electrodes 2008A and 2008B is configured to cause the absolute difference |V1'−V2'| to exceed a threshold. Consequently, the first curve 2072 and the second curve 2074 do not coincide. If V1'−V2' become too small (e.g., by oversizing the coupling capacitance between the first and second electrodes 2008A and 2008B) then the first curve 2072 and the second curve 2074 may become almost indistinguishable. In such case, the benefits of using multiple drive circuits may be substantially diminished because the first and second capacitance maps may become equivalent to a single capacitance map.

Figure 21:
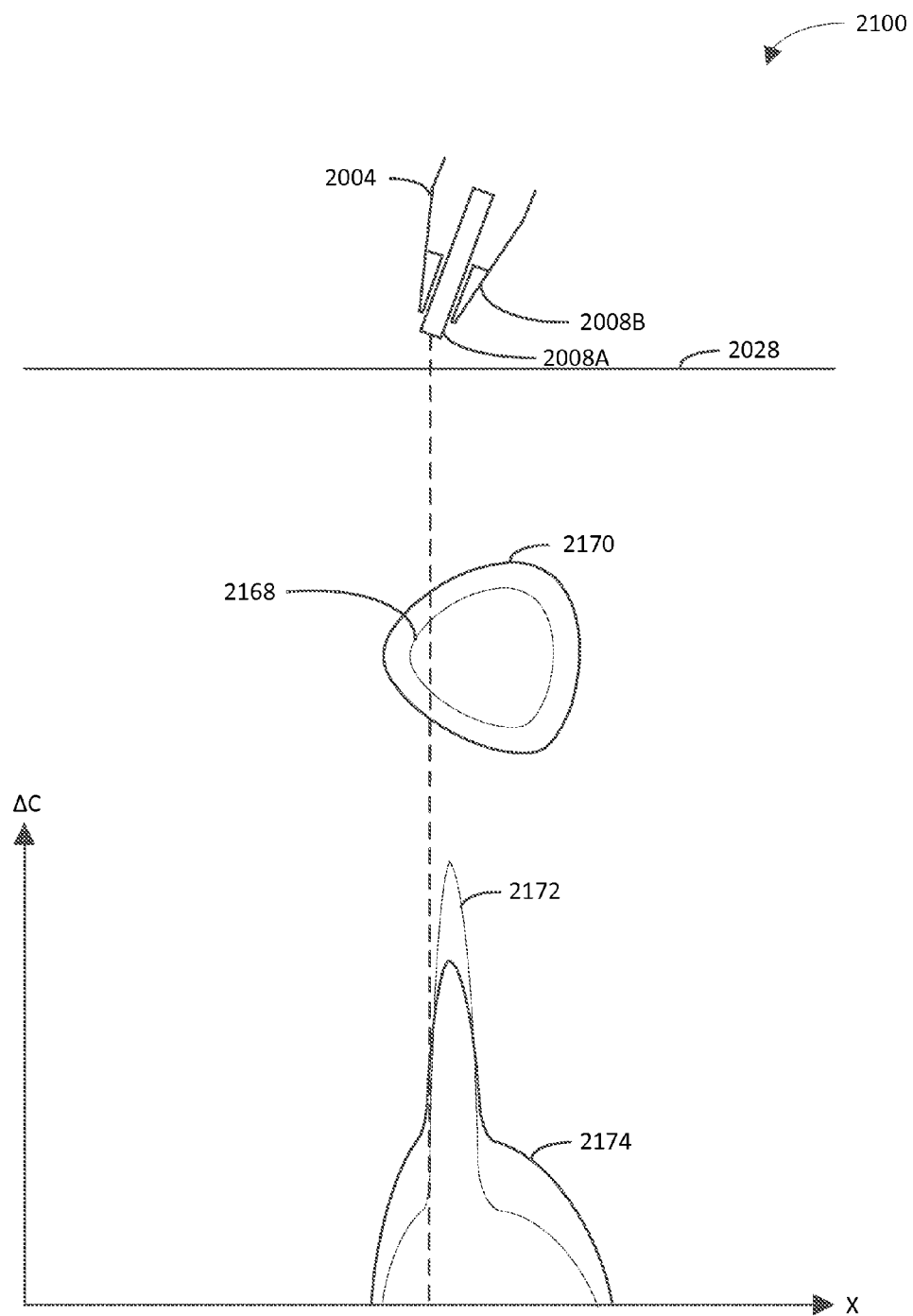

FIG. 21 shows the electrostatic device 2004 of FIG. 20 being placed proximate the sensor matrix 2028 while the electrostatic device 2004 is not orthogonal to the sensor matrix 2028. Two scenarios are depicted in FIG. 21. In the first scenario, the first drive circuit is active, and the second drive circuit is not active. In the first scenario, placing the electrostatic device 2004 proximate the sensor matrix 2028 causes a third capacitance map to be generated. A top view of the third capacitance map is represented by a third shape 2168. A side view of the third capacitance map is represented by a third curve 2172.

In the second scenario, the first drive circuit is not active, and the second drive circuit is active. In the second scenario, placing the electrostatic device 2004 proximate the sensor matrix 2028 causes a fourth capacitance map to be generated. A top view of the fourth capacitance map is represented by a fourth shape 2170. A side view of the fourth capacitance map is represented by a fourth curve 2174

As shown in FIG. 21, tilting the electrostatic device 2004 introduces an asymmetry onto both the first capacitance map and the second capacitance map. These asymmetries and/or the shapes of the first and second capacitance maps and/or the distance between the centroids of the first and second electrodes 2008A and 2008B may be used to estimate the tilt angle associated with the electrostatic device 2004.

III. Further Discussion of Some Example Embodiments

A first example electrostatic device includes a member, a first electrode, a drive circuit, and a second electrode. The member has a proximal end and a distal end at opposing ends of an axis. The first electrode is positioned at the proximal end. The first electrode is configured to electrostatically couple a principal signal to a sensor matrix of a computing device, such that an intensity of the principal signal that is sensed by the sensor matrix increases as the first electrode approaches the sensor matrix. The drive circuit is configured to generate the principal signal. The principal signal is an active signal. The second electrode is positioned a spaced distance from the first electrode. The spaced distance is configured to cause a designated capacitance between the first electrode and the second electrode to exceed a capacitance threshold and to cause the second electrode to electrostatically couple a secondary signal, which is based on the principal signal, to the sensor matrix as the first electrode is placed proximate the sensor matrix.

In a first aspect of the first example electrostatic device, the principal signal induces a first voltage that is measurable at the sensor matrix. In accordance with the first aspect, the secondary signal induces a second voltage that is measurable at the sensor matrix. In further accordance with the first aspect, the spaced distance is further configured to cause an absolute difference between the first voltage and the second voltage to exceed a voltage threshold.

In a second aspect of the first example electrostatic device, the first electrode and the second electrode are configured such that a second capacitance between the second electrode and the sensor matrix is greater than a first capacitance between the first electrode and the sensor matrix. The second aspect of the first example electrostatic device may be implemented in combination with the first aspect of the first example electrostatic device, though the example embodiments are not limited in this respect.

In a third aspect of the first example electrostatic device, the second electrode surrounds at least a portion of the first electrode in a plane that is perpendicular to the axis. The third aspect of the first example electrostatic device may be implemented in combination with the first and/or second aspect of the first example electrostatic device, though the example embodiments are not limited in this respect.

In a fourth aspect of the first example electrostatic device, a function of the principal signal and the secondary signal as measured by the sensor matrix estimates a tilt angle of the electrostatic device with respect to a vector that is normal to a plane in which the sensor matrix is defined. The fourth aspect of the first example electrostatic device may be implemented in combination with the first, second, and/or third aspect of the first example electrostatic device, though the example embodiments are not limited in this respect.

In a fifth aspect of the first example electrostatic device, the first example electrostatic device further comprises a second drive circuit configured to generate an auxiliary signal, the auxiliary signal being a second active signal. In accordance with the fifth aspect, the second electrode is configured to electrostatically couple the auxiliary signal to the sensor matrix as the first electrode is placed proximate the sensor matrix. In further accordance with the fifth aspect, a function of the principal signal and the auxiliary signal as measured by the sensor matrix estimates a tilt angle of the electrostatic device with respect to a vector that is normal to a plane in which the sensor matrix is defined.

In an example of the fifth aspect, the first drive circuit is configured to have a relatively low output impedance during a first time period in which the principal signal is coupled to the sensor matrix. In accordance with this example, the second drive circuit is configured to have a relatively low output impedance during a second time period in which the secondary signal is coupled to the sensor matrix. In further accordance with this example, the first drive circuit is configured to have a relatively high output impedance during the second time period. In further accordance with this example, the second drive circuit is configured to have a relatively high output impedance during the first time period.

In another example of the fifth aspect, the auxiliary signal is phase shifted with respect to the principal signal, such that the auxiliary and principal signals do not transition simultaneously.

The fifth aspect of the first example electrostatic device may be implemented in combination with the first, second, third, and/or fourth aspect of the first example electrostatic device, though the example embodiments are not limited in this respect.

In a sixth aspect of the first example electrostatic device, the second electrode is configured to be a passive slug. The sixth aspect of the first example electrostatic device may be implemented in combination with the first, second, third, and/or fourth aspect of the first example electrostatic device, though the example embodiments are not limited in this respect.

A second example electrostatic device includes a member, a first electrode, a drive circuit, a second electrode, and an impedance component. The first electrode is positioned at the proximal end. The first electrode is configured to electrostatically couple a principal signal to a sensor matrix of a computing device, such that an intensity of the principal signal that is sensed by the sensor matrix increases as the first electrode approaches the sensor matrix. The principal signal induces a first voltage that is measurable at the sensor matrix. The drive circuit is configured to generate the principal signal. The principal signal is an active signal. The second electrode is positioned a spaced distance from the first electrode. The second electrode is configured to electrostatically couple a secondary signal, which is based on the principal signal, to the sensor matrix as the first electrode is placed proximate the sensor matrix. The secondary signal induces a second voltage that is measurable at the sensor matrix. The impedance component is electrically connected between the first electrode and the second electrode. The impedance component is configured to provide a designated impedance that is less than an impedance threshold while causing an absolute difference between the first voltage and the second voltage to exceed a voltage threshold.

In a first aspect of the second example electrostatic device, the first electrode and the second electrode are configured such that a second capacitance between the second electrode and the sensor matrix is greater than a first capacitance between the first electrode and the sensor matrix.

In a second aspect of the second example electrostatic device, the second electrode surrounds at least a portion of the first electrode in a plane that is perpendicular to the axis. The second aspect of the second example electrostatic device may be implemented in combination with the first aspect of the second example electrostatic device, though the example embodiments are not limited in this respect.

In a third aspect of the second example electrostatic device, the impedance component includes a resistor. The third aspect of the second example electrostatic device may be implemented in combination with the first and/or second aspect of the second example electrostatic device, though the example embodiments are not limited in this respect.

In a fourth aspect of the second example electrostatic device, the impedance component includes a capacitor. The fourth aspect of the second example electrostatic device may be implemented in combination with the first, second, and/or third aspect of the second example electrostatic device, though the example embodiments are not limited in this respect.

In a fifth aspect of the second example electrostatic device, a function of the principal signal and the secondary signal as measured by the sensor matrix estimates a tilt angle of the electrostatic device with respect to a vector that is normal to a plane in which the sensor matrix is defined. The fifth aspect of the second example electrostatic device may be implemented in combination with the first, second, third, and/or fourth aspect of the second example electrostatic device, though the example embodiments are not limited in this respect.

In a sixth aspect of the second example electrostatic device, the second example electrostatic device further comprises a second drive circuit configured to generate an auxiliary signal, the auxiliary signal being a second active signal. In accordance with the sixth aspect, the second electrode is configured to electrostatically couple the auxiliary signal to the sensor matrix as the first electrode is placed proximate the sensor matrix. In further accordance with the sixth aspect, a function of the principal signal and the auxiliary signal as measured by the sensor matrix estimates a tilt angle of the electrostatic device with respect to a vector that is normal to a plane in which the sensor matrix is defined.

In an example of the sixth aspect, the first drive circuit is configured to have a relatively low output impedance during a first time period in which the principal signal is coupled to the sensor matrix. In accordance with this example, the second drive circuit is configured to have a relatively low output impedance during a second time period in which the secondary signal is coupled to the sensor matrix. In further accordance with this example, the first drive circuit is configured to have a relatively high output impedance during the second time period. In further accordance with this example, the second drive circuit is configured to have a relatively high output impedance during the first time period.

In another example of the sixth aspect, the auxiliary signal is phase shifted with respect to the principal signal, such that the auxiliary and principal signals do not transition simultaneously.

The sixth aspect of the second example electrostatic device may be implemented in combination with the first, second, third, fourth, and/or fifth aspect of the second example electrostatic device, though the example embodiments are not limited in this respect.

A third example electrostatic device includes a member, a first electrode, a drive circuit, and a plurality of second electrodes. The member has a proximal end and a distal end at opposing ends of an axis. The first electrode is positioned at the proximal end. The first electrode is configured to electrostatically couple a principal signal to a sensor matrix of a computing device, such that an intensity of the principal signal that is sensed by the sensor matrix increases as the first electrode approaches the sensor matrix. The drive circuit is configured to generate the principal signal. The principal signal is an active signal. The plurality of second electrodes is configured to electrostatically couple a plurality of respective secondary signals, which are based on the principal signal, to the sensor matrix as the first electrode is placed proximate the sensor matrix. Each second electrode of the plurality of second electrodes is positioned a respective spaced distance from the first electrode. Each spaced distance is configured to cause a respective designated capacitance between the first electrode and the respective second electrode to exceed a capacitance threshold.

In a first aspect of the third example electrostatic device, the principal signal induces a first voltage that is measurable at the sensor matrix. In accordance with the first aspect, the plurality of secondary signals induces a plurality of respective second voltages that are measurable at the sensor matrix. In further accordance with the first aspect, each spaced distance is further configured to cause an absolute difference between the first voltage and the respective second voltage of the plurality of respective second voltages to exceed a voltage threshold.

In a second aspect of the third example electrostatic device, the first electrode and the plurality of second electrodes are configured such that a sum of a plurality of respective second capacitances between the plurality of respective second electrodes and the sensor matrix is greater than a first capacitance between the first electrode and the sensor matrix. The second aspect of the third example electrostatic device may be implemented in combination with the first aspect of the third example electrostatic device, though the example embodiments are not limited in this respect.

In a third aspect of the third example electrostatic device, the plurality of second electrodes is included in a segmented ring that surrounds at least a portion of the first electrode in a plane that is perpendicular to the axis. The third aspect of the third example electrostatic device may be implemented in combination with the first and/or second aspect of the third example electrostatic device, though the example embodiments are not limited in this respect.

In a fourth aspect of the third example electrostatic device, a function of the principal signal and at least one secondary signal of the plurality of secondary signals as measured by the sensor matrix estimates a tilt angle of the electrostatic device with respect to a vector that is normal to a plane in which the sensor matrix is defined. The fourth aspect of the third example electrostatic device may be implemented in combination with the first, second, and/or third aspect of the third example electrostatic device, though the example embodiments are not limited in this respect.

In a fifth aspect of the third example electrostatic device, the third example electrostatic device further comprises one or more second drive circuits configured to generate one or more respective auxiliary signals. In accordance with the fifth aspect, the one or more auxiliary signals are one or more respective second active signals. In further accordance with the fifth aspect, one or more second electrodes of the plurality of second electrodes are configured to electrostatically couple the one or more respective auxiliary signals to the sensor matrix as the first electrode is placed proximate the sensor matrix. In further accordance with the fifth aspect, a function of the principal signal and at least one of the one or more auxiliary signals as measured by the sensor matrix estimates a tilt angle of the electrostatic device with respect to a vector that is normal to a plane in which the sensor matrix is defined. In further accordance with the fifth aspect, a function of the principal signal and at least one of the one or more auxiliary signals as measured by the sensor matrix estimates a twist angle of the electrostatic device with respect to the axis of the member.

In an example of the fifth aspect, the first drive circuit is configured to have a relatively low output impedance during a first time period in which the principal signal is coupled to the sensor matrix. In accordance with this example, the one or more second drive circuits are configured to have a relatively low output impedance during one or more respective second time periods in which the respective secondary signals are coupled to the sensor matrix. In further accordance with this example, the first drive circuit is configured to have a relatively high output impedance during the one or more second time periods. In further accordance with this example, each second drive circuit of the one or more second drive circuits is configured to have a relatively high output impedance during the first time period and during each of the one or more second time periods during which the respective secondary signal is not coupled to the sensor matrix.

In another example of the fifth aspect, each auxiliary signal of the one or more auxiliary signals is phase shifted with respect to the principal signal and with respect to each other auxiliary signal of the one or more auxiliary signals, such that none of the auxiliary and principal signals transition simultaneously.

The fifth aspect of the third example electrostatic device may be implemented in combination with the first, second, third, and/or fourth aspect of the third example electrostatic device, though the example embodiments are not limited in this respect.

In an sixth aspect of the third example electrostatic device, one or more second electrodes of the plurality of second electrodes are configured to be one or more respective passive slugs. The sixth aspect of the third example electrostatic device may be implemented in combination with the first, second, third, fourth, and/or fifth aspect of the third example electrostatic device, though the example embodiments are not limited in this respect.

IV. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An electrostatic device comprising:
a member having a proximal end and a distal end at opposing ends of an axis;
a first electrode positioned at the proximal end, the first electrode configured to electrostatically couple a principal signal to a sensor matrix of a computing device, such that an intensity of the principal signal that is sensed by the sensor matrix increases as the first electrode approaches the sensor matrix;
a drive circuit configured to generate the principal signal, the principal signal being an active signal; and
a second electrode positioned a spaced distance from the first electrode, the spaced distance configured to cause a designated capacitance between the first electrode and the second electrode to exceed a capacitance threshold and to cause the second electrode to electrostatically couple a secondary signal, which is based on the principal signal, to the sensor matrix as the first electrode is placed proximate the sensor matrix.

2. The electrostatic device of claim 1, wherein the principal signal induces a first voltage that is measurable at the sensor matrix;
wherein the secondary signal induces a second voltage that is measurable at the sensor matrix; and
wherein the spaced distance is further configured to cause an absolute difference between the first voltage and the second voltage to exceed a voltage threshold.

3. The electrostatic device of claim 1, wherein the first electrode and the second electrode are configured such that a second capacitance between the second electrode and the sensor matrix is greater than a first capacitance between the first electrode and the sensor matrix.

4. The electrostatic device of claim 1, wherein the second electrode surrounds at least a portion of the first electrode in a plane that is perpendicular to the axis.

5. The electrostatic device of claim 1, wherein a function of the principal signal and the secondary signal as measured by the sensor matrix estimates a tilt angle of the electrostatic device with respect to a vector that is normal to a plane in which the sensor matrix is defined.

6. The electrostatic device of claim 1, further comprising:
a second drive circuit configured to generate an auxiliary signal, the auxiliary signal being a second active signal;
wherein the second electrode is configured to electrostatically couple the auxiliary signal to the sensor matrix as the first electrode is placed proximate the sensor matrix; and
wherein a function of the principal signal and the auxiliary signal as measured by the sensor matrix estimates a tilt angle of the electrostatic device with respect to a vector that is normal to a plane in which the sensor matrix is defined.

7. The electrostatic device of claim 6, wherein the first drive circuit is configured to have a relatively low output impedance during a first time period in which the principal signal is provided to the sensor matrix;
wherein the second drive circuit is configured to have a relatively low output impedance during a second time period in which the secondary signal is provided to the sensor matrix;
wherein the first drive circuit is configured to have a relatively high output impedance during the second time period; and
wherein the second drive circuit is configured to have a relatively high output impedance during the first time period.

8. The electrostatic device of claim 6, wherein the auxiliary signal is phase shifted with respect to the principal signal, such that the auxiliary and principal signals do not transition simultaneously.

9. An electrostatic device comprising:
a member having a proximal end and a distal end at opposing ends of an axis;
a first electrode positioned at the proximal end, the first electrode configured to electrostatically couple a principal signal to a sensor matrix of a computing device, such that an intensity of the principal signal that is sensed by the sensor matrix increases as the first electrode approaches the sensor matrix, the principal signal inducing a first voltage that is measurable at the sensor matrix;
a drive circuit configured to generate the principal signal, the principal signal being an active signal;
a second electrode positioned a spaced distance from the first electrode, the second electrode configured to electrostatically couple a secondary signal, which is based on the principal signal, to the sensor matrix as the first electrode is placed proximate the sensor matrix, the secondary signal inducing a second voltage that is measurable at the sensor matrix; and
an impedance component electrically connected between the first electrode and the second electrode, the impedance component configured to provide a designated impedance that is less than an impedance threshold while causing an absolute difference between the first voltage and the second voltage to exceed a voltage threshold.

10. The electrostatic device of claim 9, wherein the first electrode and the second electrode are configured such that a second capacitance between the second electrode and the sensor matrix is greater than a first capacitance between the first electrode and the sensor matrix.

11. The electrostatic device of claim 9, wherein the second electrode surrounds at least a portion of the first electrode in a plane that is perpendicular to the axis.

12. The electrostatic device of claim 9, wherein a function of the principal signal and the secondary signal as measured by the sensor matrix estimates a tilt angle of the electrostatic device with respect to a vector that is normal to a plane in which the sensor matrix is defined.

13. The electrostatic device of claim 9, further comprising:
a second drive circuit configured to generate an auxiliary signal, the auxiliary signal being a second active signal;
wherein the second electrode is configured to electrostatically couple the auxiliary signal to the sensor matrix as the first electrode is placed proximate the sensor matrix; and wherein a function of the principal signal and the auxiliary signal as measured by the sensor matrix estimates a tilt angle of the electrostatic device with respect to a vector that is normal to a plane in which the sensor matrix is defined.

14. The electrostatic device of claim 13, wherein the first drive circuit is configured to have a relatively low output impedance during a first time period in which the principal signal is provided to the sensor matrix;
   wherein the second drive circuit is configured to have a relatively low output impedance during a second time period in which the secondary signal is provided to the sensor matrix;
   wherein the first drive circuit is configured to have a relatively high output impedance during the second time period; and
   wherein the second drive circuit is configured to have a relatively high output impedance during the first time period.

15. The electrostatic device of claim 13, wherein the auxiliary signal is phase shifted with respect to the principal signal, such that the auxiliary signal and the principal signal do not transition simultaneously.

16. An electrostatic device comprising:
   a member having a proximal end and a distal end at opposing ends of an axis;
   a first electrode positioned at the proximal end, the first electrode configured to electrostatically couple a principal signal to a sensor matrix of a computing device, such that an intensity of the principal signal that is sensed by the sensor matrix increases as the first electrode approaches the sensor matrix;
   a drive circuit configured to generate the principal signal, the principal signal being an active signal; and
   a plurality of second electrodes configured to electrostatically couple a plurality of respective secondary signals, which are based on the principal signal, to the sensor matrix as the first electrode is placed proximate the sensor matrix, each second electrode positioned a respective spaced distance from the first electrode, each spaced distance configured to cause a respective designated capacitance between the first electrode and the respective second electrode to exceed a capacitance threshold.

17. The electrostatic device of claim 16, wherein the principal signal induces a first voltage that is measurable at the sensor matrix;
   wherein the plurality of secondary signals induces a plurality of respective second voltages that are measurable at the sensor matrix; and
   wherein each spaced distance is further configured to cause an absolute difference between the first voltage and the respective second voltage to exceed a voltage threshold.

18. The electrostatic device of claim 16, wherein the first electrode and the plurality of second electrodes are configured such that a sum of a plurality of respective second capacitances between the sensor matrix and the plurality of respective second electrodes is greater than a first capacitance between the first electrode and the sensor matrix.

19. The electrostatic device of claim 16, further comprising:
   one or more second drive circuits configured to generate one or more respective auxiliary signals, the one or more auxiliary signals being active signals;
   wherein one or more second electrodes of the plurality of second electrodes are configured to electrostatically couple the one or more respective auxiliary signals to the sensor matrix as the first electrode is placed proximate the sensor matrix;
   wherein a function of the principal signal and at least one of the one or more auxiliary signals as measured by the sensor matrix estimates a tilt angle of the electrostatic device with respect to a vector that is normal to a plane in which the sensor matrix is defined; and
   wherein a function of the principal signal and at least one of the one or more auxiliary signals as measured by the sensor matrix estimates a twist angle of the electrostatic device with respect to the axis of the member.

20. The electrostatic device of claim 19, wherein the first drive circuit is configured to have a relatively low output impedance during a first time period in which the principal signal is provided to the sensor matrix;
   wherein the one or more second drive circuits are configured to have a relatively low output impedance during one or more respective second time periods in which the respective secondary signals are provided to the sensor matrix;
   wherein the first drive circuit is configured to have a relatively high output impedance during the one or more second time periods; and
   wherein each second drive circuit of the one or more second drive circuits is configured to have a relatively high output impedance during the first time period and during each of the one or more second time periods when the respective secondary signal is not provided to the sensor matrix.

* * * * *